United States Patent
Umemoto et al.

(10) Patent No.: US 9,238,200 B2
(45) Date of Patent: *Jan. 19, 2016

(54) EXHAUST PURIFICATION SYSTEM OF INTERNAL COMBUSTION ENGINE

(71) Applicant: TOYOTA JIDOSHA KABUSHIKI KAISHA, Toyota-Shi, Aichi (JP)

(72) Inventors: Kazuhiro Umemoto, Susono (JP); Kohei Yoshida, Gotemba (JP); Mikio Inoue, Susono (JP); Yuki Bisaiji, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/152,629

(22) Filed: Jan. 10, 2014

(65) Prior Publication Data

US 2014/0127101 A1  May 8, 2014

Related U.S. Application Data

(62) Division of application No. 13/202,692, filed as application No. PCT/JP2010/065186 on Aug. 30, 2010, now Pat. No. 8,679,410.

(51) Int. Cl.
*B01D 50/00* (2006.01)
*B01D 53/94* (2006.01)
(Continued)

(52) U.S. Cl.
CPC ........ *B01D 53/9454* (2013.01); *B01D 53/9409* (2013.01); *B01D 53/9495* (2013.01);
(Continued)

(58) Field of Classification Search
CPC ............... B01D 53/9495; B01D 2251/208; B01D 2255/91; F01N 3/0842; F01N 3/035; F02D 41/0275
USPC ................................. 423/213.5, 212
See application file for complete search history.

(56) References Cited

U.S. PATENT DOCUMENTS 5,052,178 A  10/1991  Clerc et al.
5,057,483 A  10/1991  Wan
(Continued)

FOREIGN PATENT DOCUMENTS

CN  101454081 A  6/2009
CN  101600860 A  12/2009
(Continued)

OTHER PUBLICATIONS

Corrected Notice of Allowability dated Feb. 6, 2014 issued in U.S. Appl. No. 13/202,694.
(Continued)

*Primary Examiner* — Tom P Duong
(74) *Attorney, Agent, or Firm* — Oliff PLC

(57) ABSTRACT

A method for purifying exhaust gas of an internal combustion engine including flowing an exhaust gas containing $NO_x$ and a concentration of hydrocarbons in an exhaust gas passage that contains an exhaust purification catalyst, wherein the concentration of hydrocarbons is vibrated within a predetermined range of amplitude and period, and a least a portion of the hydrocarbons are reformed by the exhaust purification catalyst; reacting the $NO_x$ contained in the exhaust gas and the reformed hydrocarbons to produce a reducing intermediate; and chemically reducing, wherein at the time of engine operation, a demanded produced amount of the reducing intermediate required for chemically reducing the $NO_x$ is calculated, and the amplitude and vibration period of the concentration of hydrocarbons flowing into the exhaust purification catalyst are controlled so that an amount of the reducing intermediate produced becomes the demanded produced amount.

15 Claims, 26 Drawing Sheets

(51) Int. Cl.
  *F01N 3/08* (2006.01)
  *F02D 41/02* (2006.01)
  *F01N 3/035* (2006.01)
  *F01N 9/00* (2006.01)

(52) U.S. Cl.
  CPC .......... *F01N3/0814* (2013.01); *F01N 3/0842* (2013.01); *F01N 3/0871* (2013.01); *F02D 41/0275* (2013.01); *B01D 53/9422* (2013.01); *B01D 2251/208* (2013.01); *B01D 2255/1021* (2013.01); *B01D 2255/1023* (2013.01); *B01D 2255/1025* (2013.01); *B01D 2255/91* (2013.01); *B01D 2258/012* (2013.01); *F01N 3/035* (2013.01); *F01N 9/007* (2013.01); *F01N 2240/30* (2013.01); *F01N 2510/06* (2013.01); *F01N 2900/1402* (2013.01); *F01N 2900/1614* (2013.01)

(56) References Cited

U.S. PATENT DOCUMENTS

| | | | |
|---|---|---|---|
| 5,075,274 | A | 12/1991 | Kiyohide et al. |
| 5,402,641 | A | 4/1995 | Katoh et al. |
| 5,882,607 | A | 3/1999 | Miyadera et al. |
| 6,109,024 | A | 8/2000 | Kinugasa et al. |
| 6,327,851 | B1 | 12/2001 | Bouchez et al. |
| 6,413,483 | B1 | 7/2002 | Brisley et al. |
| 6,477,834 | B1 | 11/2002 | Asanuma et al. |
| 6,667,018 | B2 | 12/2003 | Noda et al. |
| 6,813,882 | B2 | 11/2004 | Hepburn et al. |
| 6,854,264 | B2 | 2/2005 | Elwart et al. |
| 6,877,311 | B2 | 4/2005 | Uchida |
| 6,983,589 | B2 | 1/2006 | Lewis, Jr. et al. |
| 7,063,642 | B1 | 6/2006 | Hu et al. |
| 7,073,325 | B2 | 7/2006 | Nakatani et al. |
| 7,082,753 | B2 * | 8/2006 | Dalla Betta et al. ............ 60/286 |
| 7,111,456 | B2 | 9/2006 | Yoshida et al. |
| 7,137,379 | B2 | 11/2006 | Sasaki et al. |
| 7,146,800 | B2 | 12/2006 | Toshioka et al. |
| 7,165,393 | B2 | 1/2007 | Betta et al. |
| 7,299,625 | B2 | 11/2007 | Uchida et al. |
| 7,332,135 | B2 * | 2/2008 | Gandhi et al. ................ 422/177 |
| 7,412,823 | B2 | 8/2008 | Reuter et al. |
| 7,454,900 | B2 | 11/2008 | Hayashi |
| 7,484,504 | B2 | 2/2009 | Kato et al. |
| 7,506,502 | B2 | 3/2009 | Nakano et al. |
| 7,549,284 | B2 | 6/2009 | Iihoshi et al. |
| 7,703,275 | B2 | 4/2010 | Asanuma et al. |
| 7,707,821 | B1 | 5/2010 | Legare |
| 7,861,516 | B2 | 1/2011 | Allansson et al. |
| 8,099,950 | B2 | 1/2012 | Kojima et al. |
| 8,215,101 | B2 | 7/2012 | Tsujimoto et al. |
| 8,261,532 | B2 | 9/2012 | Fukuda et al. |
| 8,281,569 | B2 | 10/2012 | Handa et al. |
| 8,434,296 | B2 | 5/2013 | Wada et al. |
| 8,572,950 | B2 | 11/2013 | Bisaiji et al. |
| 8,656,706 | B2 | 2/2014 | Umemoto et al. |
| 8,671,667 | B2 | 3/2014 | Bisaiji et al. |
| 8,679,410 | B2 | 3/2014 | Umemoto et al. |
| 8,689,543 | B2 | 4/2014 | Numata et al. |
| 8,695,325 | B2 | 4/2014 | Bisaiji et al. |
| 2001/0052232 | A1 | 12/2001 | Hoffmann et al. |
| 2002/0029564 | A1 | 3/2002 | Roth et al. |
| 2002/0053202 | A1 * | 5/2002 | Akama et al. .................. 60/297 |
| 2003/0010020 | A1 | 1/2003 | Taga et al. |
| 2003/0040432 | A1 | 2/2003 | Beall et al. |
| 2003/0101713 | A1 | 6/2003 | Dalla Betta et al. |
| 2004/0045285 | A1 | 3/2004 | Penetrante et al. |
| 2004/0050037 | A1 | 3/2004 | Betta et al. |
| 2004/0055285 | A1 | 3/2004 | Rohr et al. |
| 2004/0154288 | A1 | 8/2004 | Okada et al. |
| 2004/0175305 | A1 | 9/2004 | Nakanishi et al. |
| 2004/0187477 | A1 | 9/2004 | Okugawa et al. |
| 2005/0135977 | A1 | 6/2005 | Park et al. |
| 2005/0147541 | A1 | 7/2005 | Ajisaka et al. |
| 2006/0053778 | A1 | 3/2006 | Asanuma et al. |
| 2006/0107657 | A1 | 5/2006 | Bernler et al. |
| 2006/0153761 | A1 | 7/2006 | Bandl-Konrad et al. |
| 2006/0286012 | A1 | 12/2006 | Socha et al. |
| 2007/0016357 | A1 | 1/2007 | Nakagawa et al. |
| 2007/0028601 | A1 | 2/2007 | Duvinage et al. |
| 2007/0059223 | A1 | 3/2007 | Golunski et al. |
| 2007/0089403 | A1 | 4/2007 | Pfeifer et al. |
| 2007/0125073 | A1 | 6/2007 | Reuter et al. |
| 2007/0151232 | A1 | 7/2007 | Dalla Betta et al. |
| 2008/0022662 | A1 | 1/2008 | Yan |
| 2008/0053073 | A1 | 3/2008 | Kalyanaraman et al. |
| 2008/0102010 | A1 | 5/2008 | Bruck et al. |
| 2008/0120963 | A1 | 5/2008 | Morita et al. |
| 2008/0148711 | A1 | 6/2008 | Takubo |
| 2008/0154476 | A1 | 6/2008 | Takubo |
| 2008/0196398 | A1 | 8/2008 | Yan |
| 2008/0223020 | A1 | 9/2008 | Yoshida et al. |
| 2008/0276602 | A1 | 11/2008 | McCabe et al. |
| 2009/0000277 | A1 | 1/2009 | Yoshida et al. |
| 2009/0049824 | A1 | 2/2009 | Kojima et al. |
| 2009/0049825 | A1 | 2/2009 | Ohashi |
| 2009/0049826 | A1 | 2/2009 | Toshioka et al. |
| 2009/0077948 | A1 | 3/2009 | Mondori et al. |
| 2009/0084091 | A1 | 4/2009 | Tsujimoto et al. |
| 2009/0118121 | A1 | 5/2009 | Sarai |
| 2009/0120072 | A1 | 5/2009 | Dalla Betta et al. |
| 2009/0151332 | A1 | 6/2009 | Toshioka et al. |
| 2009/0191108 | A1 | 7/2009 | Blanchard et al. |
| 2009/0196811 | A1 | 8/2009 | Yamashita et al. |
| 2009/0229251 | A1 | 9/2009 | Kadowaki |
| 2009/0249768 | A1 | 10/2009 | Asanuma et al. |
| 2009/0266057 | A1 | 10/2009 | Tsujimoto et al. |
| 2009/0282809 | A1 | 11/2009 | Toshioka |
| 2009/0288393 | A1 | 11/2009 | Matsuno et al. |
| 2009/0313970 | A1 | 12/2009 | Iida |
| 2010/0005873 | A1 | 1/2010 | Katoh et al. |
| 2010/0055012 | A1 | 3/2010 | Grisstede et al. |
| 2010/0107613 | A1 | 5/2010 | Masuda et al. |
| 2010/0115923 | A1 | 5/2010 | Tsujimoto et al. |
| 2010/0126148 | A1 | 5/2010 | Morishima et al. |
| 2010/0132356 | A1 | 6/2010 | Lee |
| 2010/0154387 | A1 | 6/2010 | Shibata et al. |
| 2010/0233051 | A1 | 9/2010 | Grisstede et al. |
| 2010/0236224 | A1 | 9/2010 | Kumar et al. |
| 2010/0242459 | A1 | 9/2010 | Tsujimoto et al. |
| 2011/0041486 | A1 | 2/2011 | Kato et al. |
| 2011/0047984 | A1 | 3/2011 | Lee et al. |
| 2011/0047988 | A1 | 3/2011 | Lewis et al. |
| 2011/0113754 | A1 | 5/2011 | Kohara et al. |
| 2011/0120100 | A1 | 5/2011 | Yin et al. |
| 2011/0131952 | A1 | 6/2011 | Onodera et al. |
| 2011/0173950 | A1 | 7/2011 | Wan et al. |
| 2011/0209459 | A1 | 9/2011 | Hancu et al. |
| 2012/0122660 | A1 | 5/2012 | Andersen et al. |
| 2012/0124967 | A1 | 5/2012 | Yang et al. |
| 2012/0124971 | A1 | 5/2012 | Bisaiji et al. |
| 2012/0131908 | A1 | 5/2012 | Bisaiji et al. |
| 2013/0000284 | A1 | 1/2013 | Bisaiji et al. |
| 2013/0011302 | A1 | 1/2013 | Bisaiji et al. |
| 2013/0022512 | A1 | 1/2013 | Bisaiji et al. |

FOREIGN PATENT DOCUMENTS

| | | | |
|---|---|---|---|
| EP | 1 033 479 | A2 | 9/2000 |
| EP | 1 273 337 | A1 | 1/2003 |
| EP | 1 371 415 | A1 | 12/2003 |
| EP | 1 519 015 | A2 | 3/2005 |
| EP | 1544429 | A1 | 6/2005 |
| EP | 1 710 407 | A1 | 10/2006 |
| EP | 1 793 099 | A1 | 6/2007 |
| EP | 1 911 506 | A1 | 4/2008 |
| EP | 1 936 164 | A1 | 6/2008 |
| EP | 1 965 048 | A1 | 9/2008 |
| EP | 2 063 078 | A1 | 5/2009 |
| EP | 2 149 684 | A1 | 2/2010 |
| EP | 2 239 432 | | 10/2010 |
| EP | 2 460 989 | A1 | 6/2012 |

(56) References Cited

FOREIGN PATENT DOCUMENTS

| | | |
|---|---|---|
| JP | A-04-200637 | 7/1992 |
| JP | H-08-117601 | 5/1996 |
| JP | A-09-004437 | 1/1997 |
| JP | A-09-220440 | 8/1997 |
| JP | A-11-30117 | 2/1999 |
| JP | A-11-062559 | 3/1999 |
| JP | A-11-081994 | 3/1999 |
| JP | A-2000-257419 | 9/2000 |
| JP | A-2002-188429 | 7/2002 |
| JP | A-2004-016850 | 1/2004 |
| JP | A-2004-36543 | 2/2004 |
| JP | A-2004-216224 | 8/2004 |
| JP | A-2004-290965 | 10/2004 |
| JP | A-2004-308526 | 11/2004 |
| JP | A-2004-316458 | 11/2004 |
| JP | A-2005-61340 | 3/2005 |
| JP | A-2005-113801 | 4/2005 |
| JP | A-2005-171853 | 6/2005 |
| JP | A-2005-177738 | 7/2005 |
| JP | A-2006-501390 | 1/2006 |
| JP | A-2006-512529 | 4/2006 |
| JP | A-2006-342700 | 12/2006 |
| JP | A-2007-64167 | 3/2007 |
| JP | A 2007-514090 | 5/2007 |
| JP | A-2007-514104 | 5/2007 |
| JP | A-2007-154794 | 6/2007 |
| JP | B2 3969450 | 9/2007 |
| JP | A-2007-278120 | 10/2007 |
| JP | A-2008-002451 | 1/2008 |
| JP | A-2008-19760 | 1/2008 |
| JP | A-2008-69769 | 3/2008 |
| JP | A-2008-231926 | 10/2008 |
| JP | A-2008-232003 | 10/2008 |
| JP | A-2008-255858 | 10/2008 |
| JP | A-2008-267178 | 11/2008 |
| JP | A 2008-267217 | 11/2008 |
| JP | A 2008-286186 | 11/2008 |
| JP | A 2008-543559 | 12/2008 |
| JP | A-2009-30560 | 2/2009 |
| JP | A-2009-112967 | 5/2009 |
| JP | A-2009-114879 | 5/2009 |
| JP | A-2009-156067 | 7/2009 |
| JP | A-2009-165922 | 7/2009 |
| JP | A-2009-167973 | 7/2009 |
| JP | A-2009-168031 | 7/2009 |
| JP | A-2009-191823 | 8/2009 |
| JP | A-2009-221939 | 10/2009 |
| JP | A-2009-226349 | 10/2009 |
| JP | A-2009-243362 | 10/2009 |
| JP | A-2009-275631 | 11/2009 |
| JP | A-2009-275666 | 11/2009 |
| JP | A-2010-012459 | 1/2010 |
| JP | A-2010-048134 | 3/2010 |
| JP | A-2011-190803 | 9/2011 |
| JP | B1-4868097 | 2/2012 |
| WO | WO 2005/059324 | 6/2005 |
| WO | WO 2006/131825 | 12/2006 |
| WO | WO 2007/026229 | 3/2007 |
| WO | WO 2007/141638 | 12/2007 |
| WO | WO 2008/007810 | 1/2008 |
| WO | WO 2008/012653 A2 | 1/2008 |
| WO | WO 2009/016822 | 2/2009 |
| WO | WO 2009/056958 | 5/2009 |
| WO | WO 2009/082035 A1 | 7/2009 |
| WO | WO 2011/114499 | 9/2011 |
| WO | WO 2011/114501 | 9/2011 |
| WO | WO 2011/118044 | 9/2011 |

OTHER PUBLICATIONS

Aug. 13, 2013 International Preliminary Report on Patentability issued in International Patent Application No. PCT/JP2011/053429 (with translation).
Aug. 8, 2013 Office Action issued in U.S. Appl. No. 13/258,483.
Dec. 21, 2010 International Search Report issued in International Patent Application No. PCT/JP2010/065449 (with translation).
Dec. 27, 2011 International Search Report issued in International Patent Application No. PCT/JP2011/075618 (with translation).
Jan. 18, 2011 International Search Report issued in International Patent Application No. PCT/JP2010/067705.
Jan. 18, 2011 International Search Report issued in International Patent Application No. PCT/JP2010/067707.
Jan. 18, 2011 International Search Report issued in International Patent Application No. PCT/JP2010/068785.
Jul. 14, 2014 Office Action issued in U.S. Appl. No. 13/262,001.
Jul. 14, 2014 Office Action issued in U.S. Appl. No. 13/264,884.
Jun. 16, 2014 Office Action issued in U.S. Appl. No. 13/581,186.
Jun. 18, 2014 Office Action issued in U.S. Appl. No. 13/582,909.
Jun. 19, 2014 Office Action issued in U.S. Appl. No. 13/264,594.
Jun. 21, 2011 International Search Report issued in International Patent Application No. PCT/JP2011/059880 (with translation).
Jun. 23, 2014 Office Action issued in U.S. Appl. No. 13/262,858.
Jun. 26, 2014 Office Action issued in U.S. Appl. No. 13/580,000.
Jun. 29, 2010 International Search Report issued in International Patent Application No. PCT/JP2010/055303 (with translation).
Mar. 22, 2011 International Search Report issued in International Patent Application No. PCT/JP2010/073645 (with translation).
Mar. 22, 2011 International Search Report issued in International Patent Application No. PCT/JP2010/072299 (with translation).
Mar. 8, 2011 International Search Report issued in International Patent Application No. PCT/JP2011/052969 (with translation).
May 17, 2011 International Search Report issued in International Patent Application No. PCT/JP2011/057264 (with translation).
May 2, 2014 Office Action issued in U.S. Appl. No. 13/263,660.
Mar. 28, 2014 Notice of Allowance issued in U.S. Appl. No. 13/582,862.
Mar. 4, 2014 Notice of Allowance issued in U.S. Appl. No. 13/255,786.
Oct. 17, 2013 Notice of Allowance issued in U.S. Appl. No. 13/202,694.
Oct. 26, 2010 International Search Report issued in International Patent Application No. PCT/JP2010/063135.
Oct. 23, 2013 Office Action issued in U.S. Appl. No. 13/263,272.
Apr. 23, 2014 Office Action issued in U.S. Appl. No. 13/260,986.
Apr. 3, 2014 Office Action issued in U.S. Appl. No. 13/259,574.
Jul. 1, 2014 Office Action issued in U.S. Appl. No. 13/257,789.
May 7, 2014 Office Action issued in U.S. Appl. No. 13/264,062.
May 8, 2014 Office Action issued in U.S. Appl. No. 13/375,674.
U.S. Appl. No. 13/257,789 in the name of Nishioka et al., filed Oct. 14, 2011.
U.S. Appl. No. 13/258,483 in the name of Numata et al., filed Sep. 22, 2011.
U.S. Appl. No. 13/259,574 in the name of Tsukamoto et al., filed Sep. 23, 2011.
U.S. Appl. No. 13/259,885 in the name of Umemoto et al., filed Sep. 23, 2011.
U.S. Appl. No. 13/260,986 in the name of Watanabe et al., filed Sep. 29, 2011.
U.S. Appl. No. 13/263,272 in the name of Bisaiji et al., filed Oct. 6, 2011.
U.S. Appl. No. 13/263,660 in the name of Umemoto et al., filed Oct. 7, 2011.
U.S. Appl. No. 13/264,062 in the name of Watanabe et al., filed Oct. 12, 2011.
U.S. Appl. No. 13/264,594 in the name of Inoue et al., filed Oct. 14, 2011.
U.S. Appl. No. 13/264,884 in the name of Bisaiji et al., filed Oct. 17, 2011.
U.S. Appl. No. 13/375,674 in the name of Inoue et al., filed Dec. 1, 2011.
U.S. Appl. No. 13/578,148 in the name of Umemoto et al., filed Aug. 9, 2012.
U.S. Appl. No. 13/581,186 in the name of Kazuhiro Umemoto et al., filed Aug. 24, 2012.
U.S. Appl. No. 13/580,000 in the name of Bisaiji et al., filed Aug. 20, 2012.

(56) References Cited

OTHER PUBLICATIONS

U.S. Appl. No. 13/582,862 in the name of Uenishi et al., filed Sep. 5, 2012.
U.S. Appl. No. 13/582,909 in the name of Kazuhiro Umemoto et al., filed Sep. 5, 2012.
U.S. Appl. No. 14/108,113 in the name of Bisaiji et al., filed Dec. 16, 2013.
U.S. Appl. No. 13/262,001 in the name of Inoue et al., filed Oct. 19, 2011.
Dec. 27, 2011 Written Opinion issued in International Patent Application No. PCT/JP2011/075618 (with translation).
Aug. 6, 2014 Notice of Allowance issued in U.S. Appl. No. 13/259,574.
Nov. 27, 2013 Notice of Allowance issued in U.S. Appl. No. 13/258,483.
Oct. 4, 2013 Notice of Allowance issued in U.S. Appl. No. 13/259,885.
Jun. 15, 2010 International Search Report issued in PCT/JP2010/054740 (with translation).
Jun. 15, 2010 International Search Report issued in International Patent Application No. PCT/JP2010/054731 (with translation).
Jun. 29, 2010 International Search Report issued in International Patent Application No. PCT/JP2010/056345.
Jun. 15, 2010 International Search Report issued in International Patent Application No. PCT/JP2010/054729.
Sep. 13, 2011 International Search Report issued in International Patent Application No. PCT/JP2011/066628 (with translation).
Jun. 20, 2012 Search Report issued in European Patent Application No. 10845966.0.
Apr. 4, 2013 Office Action issued in U.S. Appl. No. 13/255,710.
Oct. 24, 2013 Office Action issued in U.S. Appl. No. 13/255,710.
Jan. 17, 2013 Office Action issued in U.S. Appl. No. 13/202,733.
Jan. 22, 2014 Office Action issued in U.S. Appl. No. 13/499,211.
May 27, 2014 Office Action issued in U.S. Appl. No. 13/255,710.
Oct. 2, 2014 Office Action issued in U.S. Appl. No. 13/582,862.
Jun. 15, 2010 Written Opinion issued in PCT/JP2010/054740 (with translation).
Sep. 18, 2014 Notice of Allowance issued in U.S. Appl. No. 13/255,710.
Jul. 9, 2013 Notice of Allowance issued in U.S. Appl. No. 13/255,774.
Dec. 9, 2013 Notice of Allowance issued in U.S. Appl. No. 13/262,506.
Dec. 27, 2013 Notice of Allowance issued in U.S. Appl. No. 13/502,210.
U.S. Appl. No. 13/255,774 in the name of Bisaiji et al., filed Sep. 22, 2011.
U.S. Appl. No. 13/255,710 in the name of Bisaiji et al., filed Oct. 12, 2011.
U.S. Appl. No. 13/502,210 in the name of Bisaiji et al., filed Apr. 16, 2012.
U.S. Appl. No. 13/499,211 in the name of Bisaiji et al., filed Mar. 29, 2012.
U.S. Appl. No. 13/934,080 in the name of Bisaiji et al., filed Jul. 2, 2013.
U.S. Appl. No. 13/262,506 in the name of Bisaiji et al,, filed Sep. 30, 2011.
Dec. 22, 2014 Office Action issued in U.S. Appl. No. 13/264,230.
Written Opinion for PCT Application No. PCT/JP2010/065186 mailed Nov. 22, 2010, dated Nov. 12, 2010.
International Search Report for PCT Application No. PCT/JP2010/065186 mailed Nov. 22, 2010. International Search Report for PCT Application No. PCT/JP2010/065186 mailed Nov. 22, 2010.
International Search Report dated Jun. 15, 2010 issued in PCT/JP2010/054730 (with translation).
Mar. 15, 2011 International Search Report issued in International Application No. PCT/JP2011/053429.
Nov. 22, 2010 International Search Report issued in International Patent Application No. PCT/JP2010/065187.
Nov. 26, 2012 Office Action issued in U.S. Appl. No. 13/202,694.
U.S. Appl. No. 13/202,694 in the name of Bisaiji et al. filed Sep. 19, 2011.
U.S. Appl. No. 13/264,230 in the name of Bisaiji et al. filed Oct. 13, 2011.
U.S. Appl. No. 13/262,858 in the name of Bisaiji et al. filed Oct. 4, 2011.
May 15, 2013 Office Action in U.S. Appl. No. 13/202,694.
U.S. Appl. No. 13/202,733 in the name of Bisaiji et al. filed Sep. 30, 2011.
Notice of Allowance dated Oct. 17, 2013 issued in U.S. Appl. No. 13/202,694.
Office Action dated Dec. 20, 2013 issued in U.S. Appl. No. 13/264,230.

* cited by examiner ered within a predetermined range of amplitude and within a predetermined range of period and has a property of being increased in storage amount of $NO_x$ which is contained in the exhaust gas if lengthening the vibration period of the hydrocarbon concentration more than the predetermined range, and, at the time of engine operation, a demanded produced amount of the reducing intermediate required for reducing the $NO_x$ is calculated and the amplitude and vibration period of the concentration of hydrocarbons flowing into the exhaust purification catalyst are controlled so that an amount of production of the reducing intermediate becomes the demanded produced amount.

EXHAUST PURIFICATION SYSTEM OF INTERNAL COMBUSTION ENGINE

This is a Division of application Ser. No. 13/202,694 filed Sep. 20, 2011, which in turn is a National Stage application of PCT/JP2010/065186, filed on Aug. 30, 2010. The disclosure of the prior applications is hereby incorporated by reference herein in its entirety.

TECHNICAL FIELD

The present invention relates to an exhaust purification system of an internal combustion engine.

BACKGROUND ART

Known in the art is an internal combustion engine which arranges, in an engine exhaust passage, an $NO_x$ storage catalyst which stores $NO_x$ which is contained in exhaust gas when the air-fuel ratio of the inflowing exhaust gas is lean and which releases the stored $NO_x$ when the air-fuel ratio of the inflowing exhaust gas becomes rich, which arranges, in the engine exhaust passage upstream of the $NO_x$ storage catalyst, an oxidation catalyst which has an adsorption function, and which feeds hydrocarbons into the engine exhaust passage upstream of the oxidation catalyst to make the air-fuel ratio of the exhaust gas flowing into the $NO_x$ storage catalyst rich when released $NO_x$ from the $NO_x$ storage catalyst (for example, see Patent Literature 1).

In this internal combustion engine, the hydrocarbons which are fed when released $NO_x$ from the $NO_x$ storage catalyst are made gaseous hydrocarbons at the oxidation catalyst, and the gaseous hydrocarbons are fed to the $NO_x$ storage catalyst. As a result, the $NO_x$ which is released from the $NO_x$ storage catalyst is reduced well.

CITATION LIST

Patent Literature

Patent Literature 1: Japanese Patent No. 3969450

SUMMARY OF INVENTION

Technical Problem

However, there is the problem that when the $NO_x$ storage catalyst becomes a high temperature, the $NO_x$ purification rate falls.

An object of the present invention is to provide an exhaust purification system of an internal combustion engine which can obtain a high $NO_x$ purification rate even if the temperature of the exhaust purification catalyst becomes a high temperature.

Solution to Problem

According to the present invention, there is provided an exhaust purification system of an internal combustion engine wherein an exhaust purification catalyst is arranged in an engine exhaust passage for reacting $NO_x$ contained in exhaust gas and reformed hydrocarbons to produce a reducing intermediate containing nitrogen and hydrocarbons, a precious metal catalyst is carried on an exhaust gas flow surface of the exhaust purification catalyst and a basic exhaust gas flow surface part is formed around the precious metal catalyst, the exhaust purification catalyst has a property of producing a reducing intermediate and reducing the $NO_x$ contained in the exhaust gas by a reducing action of the produced reducing intermediate if causing vibration of a concentration of hydrocarbons flowing into the exhaust purification catalyst by

Advantageous Effects of Invention

Even if the temperature of the exhaust purification catalyst becomes a high temperature, a high $NO_x$ purification rate can be obtained.

DESCRIPTION OF EMBODIMENTS

Figure 1:
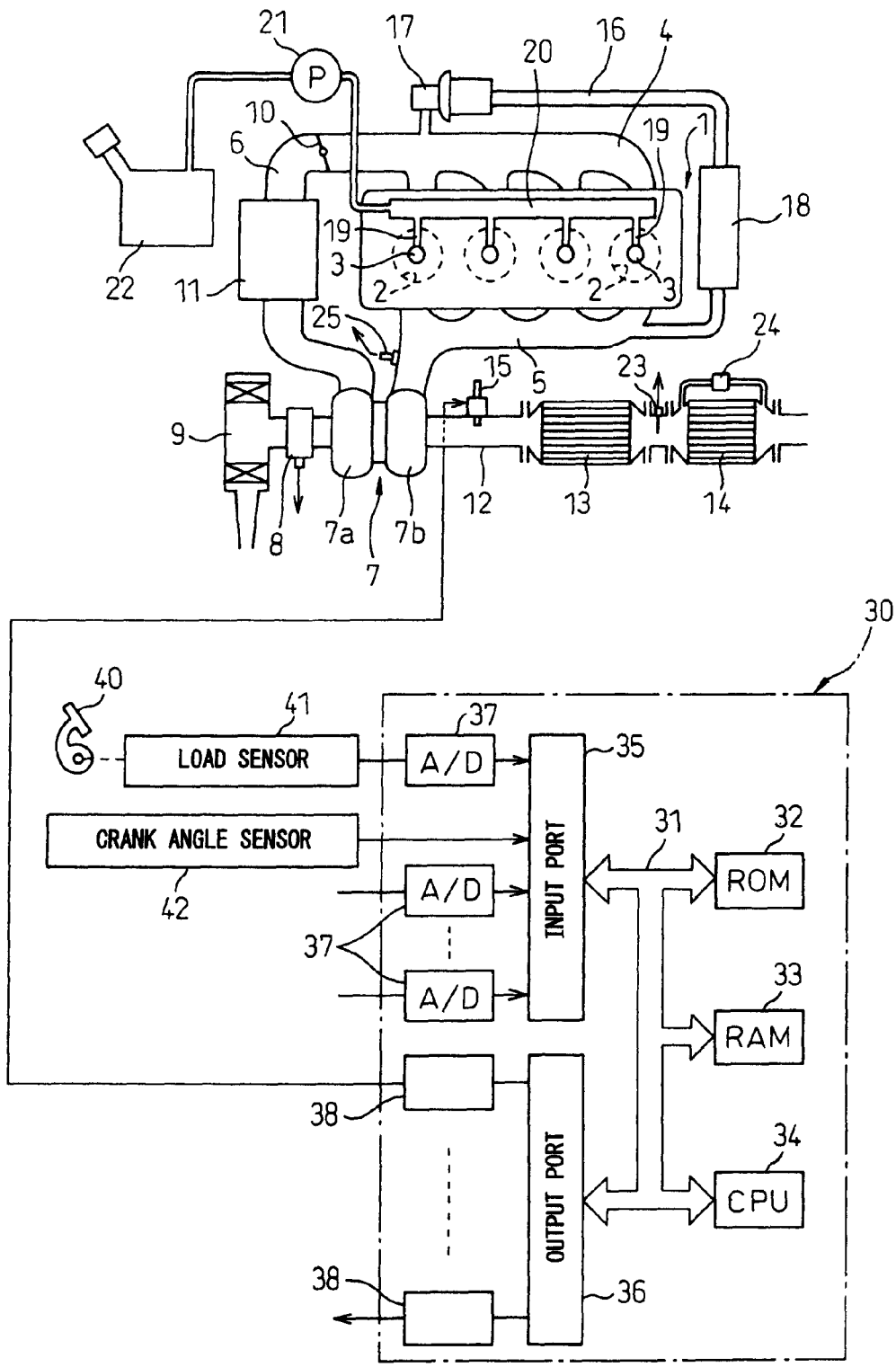
FIG. 1 is an overall view of a compression ignition type internal combustion engine.

FIG. 1 is an overall view of a compression ignition type internal combustion engine.

Referring to FIG. 1, 1 indicates an engine body, 2 a combustion chamber of each cylinder, 3 an electronically controlled fuel injector for injecting fuel into each combustion chamber 2, 4 an intake manifold, and 5 an exhaust manifold. The intake manifold 4 is connected through an intake duct 6 to an outlet of a compressor 7a of an exhaust turbocharger 7, while an inlet of the compressor 7a is connected through an intake air amount detector 8 to an air cleaner 9. Inside the intake duct 6, a throttle valve 10 driven by a step motor is arranged. Furthermore, around the intake duct 6, a cooling device 11 is arranged for cooling the intake air which flows through the inside of the intake duct 6. In the embodiment shown in FIG. 1, the engine cooling water is guided to the inside of the cooling device 11 where the engine cooling water is used to cool the intake air.

On the other hand, the exhaust manifold 5 is connected to an inlet of an exhaust turbine 7b of the exhaust turbocharger 7. The outlet of the exhaust turbine 7b is connected through an exhaust pipe 12 to an inlet of the exhaust purification catalyst 13, while the outlet of the exhaust purification catalyst 13 is connected to a particulate filter 14 for trapping particulate which is contained in the exhaust gas. Inside the exhaust pipe 12 upstream of the exhaust purification catalyst 13, a hydrocarbon feed valve 15 is arranged for feeding hydrocarbons comprised of diesel oil or other fuel used as fuel for a compression ignition type internal combustion engine. In the embodiment shown in FIG. 1, diesel oil is used as the hydrocarbons which are fed from the hydrocarbon feed valve 15. Note that, the present invention can also be applied to a spark ignition type internal combustion engine in which fuel is burned under a lean air-fuel ratio. In this case, from the hydrocarbon feed valve 15, hydrocarbons comprised of gasoline or other fuel used as fuel of a spark ignition type internal combustion engine are fed.

On the other hand, the exhaust manifold 5 and the intake manifold 4 are connected with each other through an exhaust gas recirculation (hereinafter referred to as an "EGR") passage 16. Inside the EGR passage 16, a electronically controlled EGR control valve 17 is arranged. Further, around the EGR passage 16, a cooling device 18 is arranged for cooling EGR gas flowing through the inside of the EGR passage 16. In the embodiment shown in FIG. 1, the engine cooling water is guided to the inside of the cooling device 18 where the engine cooling water is used to cool the EGR gas. On the other hand, each fuel injector 3 is connected through a fuel feed tube 19 to a common rail 20. This common rail 20 is connected through an electronically controlled variable discharge fuel pump 21 to a fuel tank 22. The fuel which is stored inside of the fuel tank 22 is fed by the fuel pump 21 to the inside of the common rail 20. The fuel which is fed to the inside of the common rail 20 is fed through each fuel feed tube 19 to the fuel injector 3.

An electronic control unit 30 is comprised of a digital computer provided with a ROM (read only memory) 32, a RAM (random access memory) 33, a CPU (microprocessor) 34, an input port 35, and an output port 36, which are connected with each other by a bidirectional bus 31. Downstream of the exhaust purification catalyst 13, a temperature sensor 23 is attached for detecting the temperature of the exhaust purification catalyst 13. The particulate filter 14 has a differential pressure sensor 24 attached for detecting the differential pressure before and after the particulate filter 14. Further, at the collecting portion of the exhaust manifold 5, an air-fuel ratio sensor 25 is arranged. The output signals of these temperature sensor 23, differential pressure sensor 24, air-fuel ratio sensor 25, and intake air amount detector 8 are input through corresponding AD converters 37 to the input port 35. Further, an accelerator pedal 40 has a load sensor 41 connected to it which generates an output voltage proportional to the amount of depression L of the accelerator pedal 40. The output voltage of the load sensor 41 is input through a corresponding AD converter 37 to the input port 35. Furthermore, at the input port 35, a crank angle sensor 42 is connected which generates an output pulse every time a crankshaft rotates by, for example, 15°. On the other hand, the output port 36 is connected through corresponding drive circuits 38 to each fuel injector 3, a step motor for driving the throttle valve 10, the hydrocarbon feed valve 15, the EGR control valve 17, and the fuel pump 21.

Figure 2:
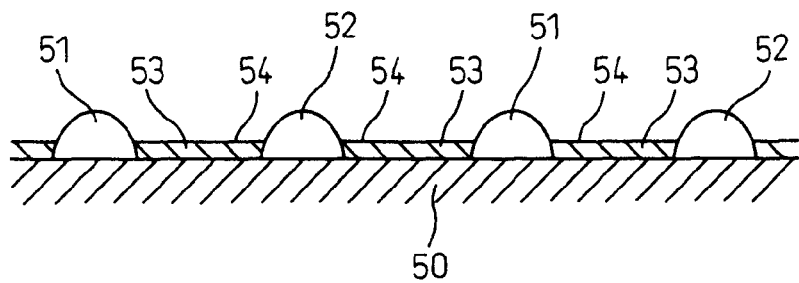
FIG. 2 is a view schematically showing a surface part of a catalyst carrier.

FIG. 2 schematically shows a surface part of a catalyst carrier which is carried on a substrate of the exhaust purification catalyst 13. At this exhaust purification catalyst 13, as shown in FIG. 2, for example, there is provided a catalyst carrier 50 made of alumina on which precious metal catalysts 51 and 52 are carried. Furthermore, on this catalyst carrier 50, a basic layer 53 is formed which includes at least one element selected from potassium K, sodium Na, cesium Cs, or another such alkali metal, barium Ba, calcium Ca, or another such alkali earth metal, a lanthanoid or another such rare earth and silver Ag, copper Cu, iron Fe, iridium Ir, or another metal able to donate electrons to $NO_x$. The exhaust gas flows along the top of the catalyst carrier 50, so the precious metal catalysts 51 and 52 can be said to be carried on the exhaust gas flow surface of the exhaust purification catalyst 13. Further, the surface of the basic layer 53 exhibits basicity, so the surface of the basic layer 53 is called the basic exhaust gas flow surface part 54.

On the other hand, in FIG. 2, the precious metal catalyst 51 is comprised of platinum Pt, while the precious metal catalyst 52 is comprised of rhodium Rh. That is, the precious metal catalysts 51 and 52 which are carried on the catalyst carrier 50 are comprised of platinum Pt and rhodium Rh. Note that, on the catalyst carrier 50 of the exhaust purification catalyst 13, in addition to platinum Pt and rhodium Rh, palladium Pd may be further carried or, instead of rhodium Rh, palladium Pd may be carried. That is, the precious metal catalysts 51 and 52 which are carried on the catalyst carrier 50 are comprised of platinum Pt and at least one of rhodium Rh and palladium Pd.

Figure 3:
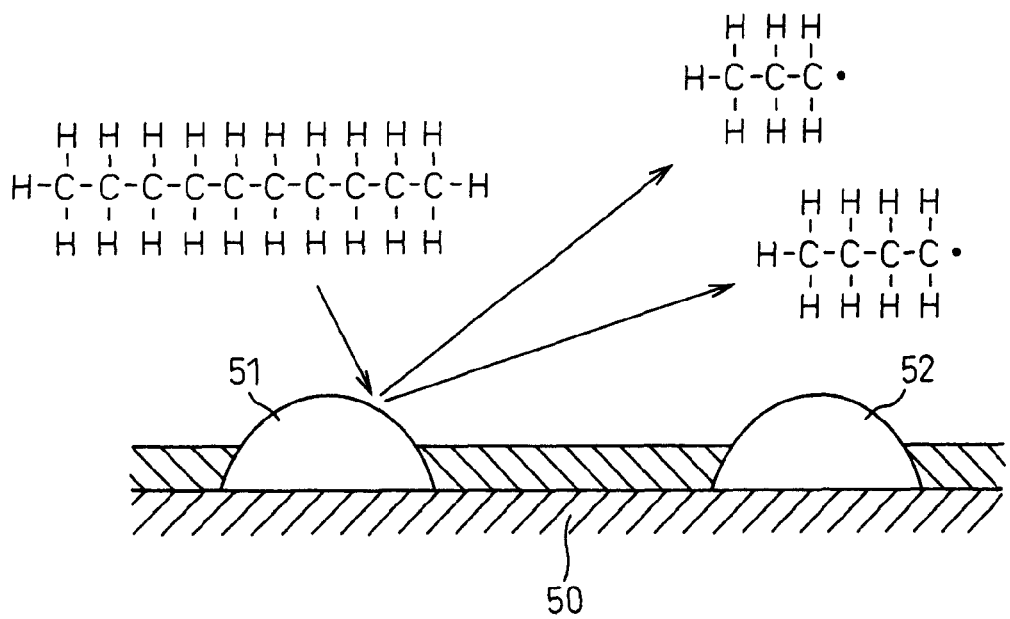
FIG. 3 is a view for explaining an oxidation reaction in an exhaust purification catalyst.

If hydrocarbons are injected from the hydrocarbon feed valve 15 into the exhaust gas, the hydrocarbons are reformed by the exhaust purification catalyst 13. In the present invention, at this time, the reformed hydrocarbons are used to remove the $NO_x$ at the exhaust purification catalyst 13. FIG. 3 schematically shows the reforming action performed at the exhaust purification catalyst 13 at this time. As shown in FIG. 3, the hydrocarbons HC which are injected from the hydrocarbon feed valve 15 become radical hydrocarbons HC with a small carbon number by the catalyst 51.

Note that, even if injecting fuel, that is, hydrocarbons, from the fuel injector 3 into the combustion chamber 2 during the latter half of the expansion stroke or during the exhaust stroke, the hydrocarbons are reformed inside of the combustion chamber 2 or at the exhaust purification catalyst 13, and the $NO_x$ which is contained in the exhaust gas is removed by the reformed hydrocarbons at the exhaust purification catalyst 13. Therefore, in the present invention, instead of feeding hydrocarbons from the hydrocarbon feed valve 15 to the inside of the engine exhaust passage, it is also possible to feed hydrocarbons into the combustion chamber 2 during the latter half of the expansion stroke or during the exhaust stroke. In this way, in the present invention, it is also possible to feed hydrocarbons to the inside of the combustion chamber 2, but below the present invention is explained taking as an example the case of injecting hydrocarbons from the hydrocarbon feed valve 15 to the inside of the engine exhaust passage.

Figure 4:
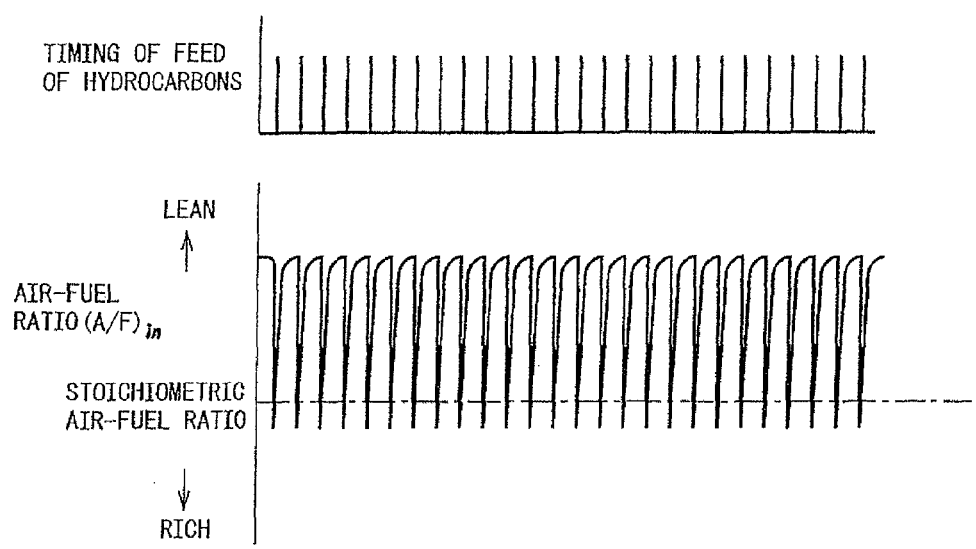
FIG. 4 is a view showing a change of an air-fuel ratio of exhaust gas flowing into an exhaust purification catalyst.

FIG. 4 shows the timing of feeding hydrocarbons from the hydrocarbon feed valve 15 and the changes in the air-fuel ratio (A/F)in of the exhaust gas flowing into the exhaust purification catalyst 13. Note that, the changes in the air-fuel ratio (A/F)in depend on the change in concentration of the hydrocarbons in the exhaust gas which flows into the exhaust purification catalyst 13, so it can be said that the change in the air-fuel ratio (A/F)in shown in FIG. 4 expresses the change in concentration of the hydrocarbons. However, if the hydrocarbon concentration becomes higher, the air-fuel ratio (A/F)in becomes smaller, so, in FIG. 4, the more the rich side the air-fuel ratio (A/F)in becomes, the higher the hydrocarbon concentration.

Figure 5:
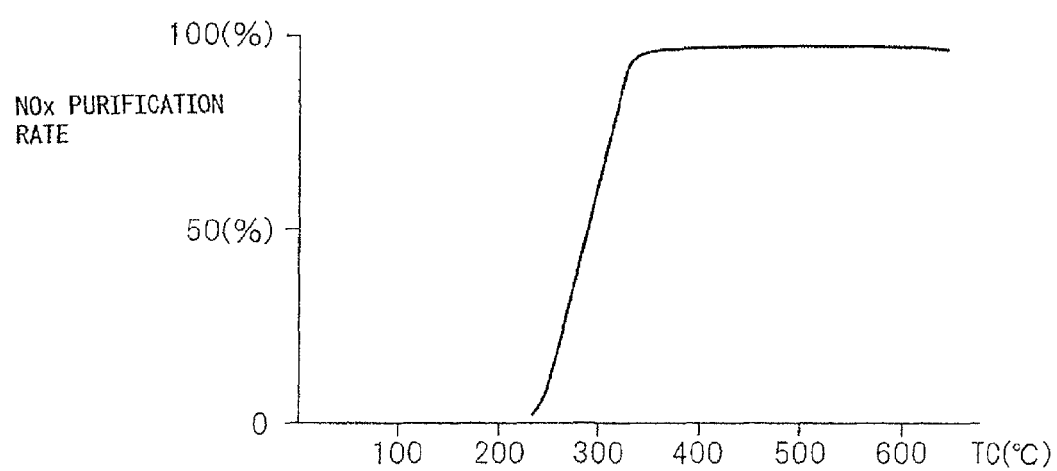
FIG. 5 is a view showing an $NO_x$ purification rate.

FIG. 5 shows the $NO_x$ purification rate by the exhaust purification catalyst 13 with respect to the catalyst temperatures of the exhaust purification catalyst 13 when periodically making the concentration of hydrocarbons flowing into the exhaust purification catalyst 13 change so as to, as shown in FIG. 4, make the air-fuel ratio (A/F)in of the exhaust gas flowing to the exhaust purification catalyst 13 change. The inventors engaged in research relating to $NO_x$ purification for a long time. In the process of research, they learned that if making the concentration of hydrocarbons flowing into the exhaust purification catalyst 13 vibrate by within a predetermined range of amplitude and within a predetermined range of period, as shown in FIG. 5, an extremely high $NO_x$ purification rate is obtained even in a 400° C. or higher high temperature region.

Figure 6A:
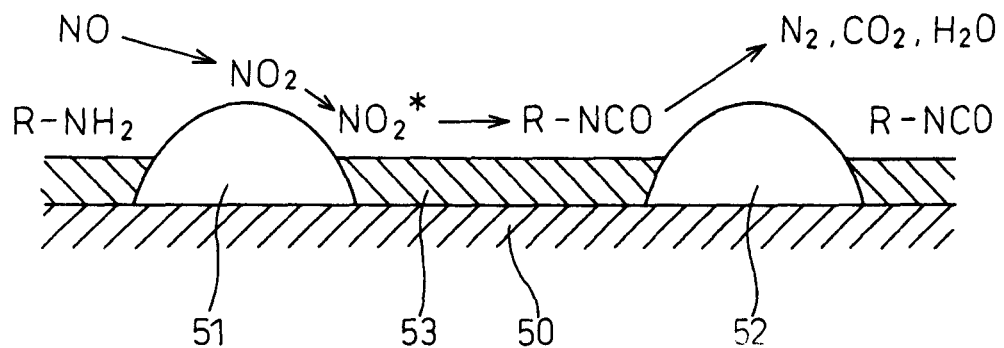
FIGS. 6A and 6B are views for explaining an oxidation reduction reaction in an exhaust purification catalyst.
Figure 6B:
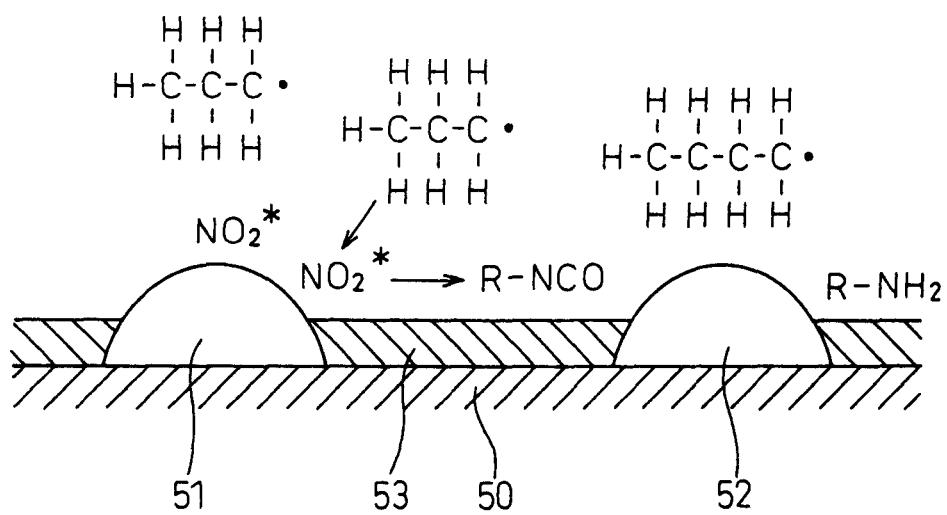

Furthermore, at this time, a large amount of reducing intermediate containing nitrogen and hydrocarbons continues to be held or adsorbed on the surface of the basic layer 53, that is, on the basic exhaust gas flow surface part 54 of the exhaust purification catalyst 13. It is learned that this reducing intermediate plays a central role in obtaining a high $NO_x$ purification rate. Next, this will be explained with reference to FIGS. 6A and 6B. Note that, these FIGS. 6A and 6B schematically show the surface part of the catalyst carrier 50 of the exhaust purification catalyst 13. These FIGS. 6A and 6B show the reaction which is presumed to occur when the concentration of hydrocarbons flowing into the exhaust purification catalyst 13 is made to vibrate by within a predetermined range of amplitude and within a predetermined range of period.

FIG. 6A shows when the concentration of hydrocarbons flowing into the exhaust purification catalyst 13 is low, while FIG. 6B shows when hydrocarbons are fed from the hydrocarbon feed valve 15 and the concentration of hydrocarbons flowing into the exhaust purification catalyst 13 becomes high.

Now, as will be understood from FIG. 4, the air-fuel ratio of the exhaust gas which flows into the exhaust purification catalyst 13 is maintained lean except for an instant, so the exhaust gas which flows into the exhaust purification catalyst 13 normally becomes a state of oxygen excess. Therefore, the NO which is contained in the exhaust gas, as shown in FIG. 6A, is oxidized on the platinum 51 and becomes $NO_2$. Next, this $NO_2$ is supplied with electrons from the platinum 51 and becomes $NO_2^-$. Therefore, a large amount of $NO_2^-$ is produced on the platinum 51. This $NO_2^-$ is strong in activity. Above, this $NO_2^-$ is called the active $NO_2^*$.

On the other hand, if hydrocarbons are fed from the hydrocarbon feed valve 15, as shown in FIG. 3, the hydrocarbons are reformed and become radicalized inside of the exhaust purification catalyst 13. As a result, as shown in FIG. 6B, the hydrocarbon concentration around the active $NO_2^*$ becomes higher. In this regard, after the active $NO_2^*$ is produced, if the state of a high oxygen concentration around the active $NO_2^*$ continues for a predetermined time or more, the active $NO_2^*$ is oxidized and is absorbed in the basic layer 53 in the form of nitrate ions $NO_3^-$. However, if the hydrocarbon concentration around the active $NO_2^*$ is made higher before this predetermined time passes, as shown in FIG. 6B, the active $NO_2$ reacts on the platinum 51 with the radical hydrocarbons HC whereby a reducing intermediate is produced. This reducing intermediate is adhered or adsorbed on the surface of the basic layer 53.

Note that, at this time, the first produced reducing intermediate is considered to be a nitro compound R—$NO_2$. If this nitro compound R—$NO_2$ is produced, the result becomes a nitrile compound R—CN, but this nitrile compound R—CN can only survive for an instant in this state, so immediately becomes an isocyanate compound R—NCO. This isocyanate compound R—NCO, when hydrolyzed, becomes an amine compound R—$NH_2$. However, in this case, what is hydrolyzed is considered to be part of the isocyanate compound R—NCO. Therefore, as shown in FIG. 6B, the majority of the reducing intermediate which is held or adsorbed on the surface of the basic layer 53 is believed to be the isocyanate compound R—NCO and amine compound R—$NH_2$.

On the other hand, as shown in FIG. 6B, if the produced reducing intermediate is surrounded by the hydrocarbons HC, the reducing intermediate is blocked by the hydrocarbons HC and the reaction will not proceed any further. In this case, if the concentration of hydrocarbons flowing into the exhaust purification catalyst 13 is lowered and thereby the oxygen concentration becomes higher, the hydrocarbons around the reducing intermediate will be oxidized. As a result, as shown in FIG. 6A, the reducing intermediate and the active $NO_2^*$ will react. At this time, the active $NO_2^*$ reacts with the reducing intermediate R—NCO or R—$NH_2$ to form $N_2$, $CO_2$, and $H_2O$ and consequently the $NO_x$ is removed.

In this way, in the exhaust purification catalyst 13, by making the concentration of hydrocarbons flowing into the exhaust purification catalyst 13 higher, a reducing intermediate is produced. By making the concentration of hydrocarbons flowing into the exhaust purification catalyst 13 lower and raising the oxygen concentration, the active $NO_2^*$ reacts with the reducing intermediate and the $NO_x$ is removed. That is, in order for the exhaust purification catalyst 13 to remove the $NO_x$, the concentration of hydrocarbons flowing into the exhaust purification catalyst 13 has to be periodically changed.

Of course, in this case, it is necessary to raise the concentration of hydrocarbons to a concentration sufficiently high for producing the reducing intermediate and it is necessary to lower the concentration of hydrocarbons to a concentration sufficiently low for making the produced reducing intermediate react with the active $NO_2^*$. That is, it is necessary to make the concentration of hydrocarbons flowing into the exhaust purification catalyst 13 vibrate by within a predetermined range of amplitude. Note that, in this case, it is necessary to hold a sufficient amount of reducing intermediate R—NCO or R—NH$_2$ on the basic layer 53, that is, the basic exhaust gas flow surface part 24, until the produced reducing intermediate reacts with the active $NO_2^*$. For this reason, the basic exhaust gas flow surface part 24 is provided.

On the other hand, if lengthening the feed period of the hydrocarbons, the time in which the oxygen concentration becomes higher becomes longer in the period after the hydrocarbons are fed until the hydrocarbons are next fed. Therefore, the active $NO_2^*$ is absorbed in the basic layer 53 in the form of nitrates without producing a reducing intermediate. To avoid this, it is necessary to make the concentration of hydrocarbons flowing into the exhaust purification catalyst 13 vibrate by within a predetermined range of period.

Therefore, in an embodiment of the present invention, to make the $NO_x$ contained in the exhaust gas and the reformed hydrocarbons react and produce the reducing intermediate R—NCO or R—NH$_2$ containing nitrogen and hydrocarbons, precious metal catalysts 51 and 52 are carried on the exhaust gas flow surface of the exhaust purification catalyst 13. To hold the produced reducing intermediate R—NCO or R—NH$_2$ inside the exhaust purification catalyst 13, a basic exhaust gas flow surface part 54 is formed around the precious metal catalysts 51 and 52. Due to the reducing action of the reducing intermediate R—NCO or R—NH$_2$ which is held on the basic exhaust gas flow surface part 54, the $NO_x$ is reduced. The vibration period of the hydrocarbon concentration is made the vibration period required for continuation of the production of the reducing intermediate R—NCO or R—NH$_2$. Incidentally, in the example shown in FIG. 4, the injection interval is made 3 seconds.

Figure 7A:
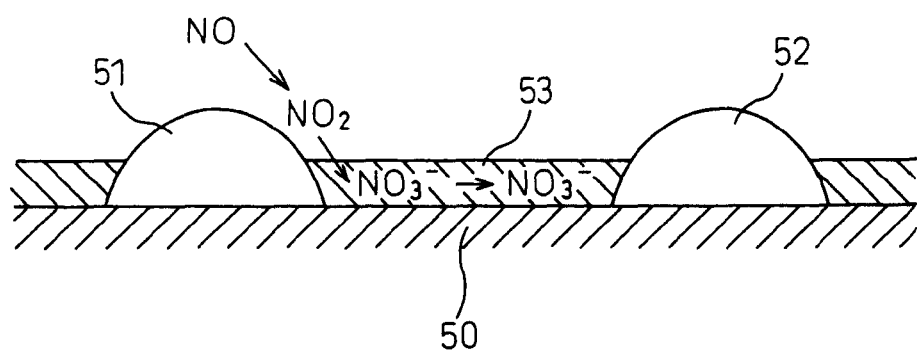
FIGS. 7A and 7B are views for explaining an oxidation reduction reaction in an exhaust purification catalyst.

If the vibration period of the hydrocarbon concentration, that is, the feed period of the hydrocarbons HC, is made longer than the above predetermined range of period, the reducing intermediate R—NCO or R—NH disappears from the surface of the basic layer 53. At this time, the active $NO_2^*$ which is produced on the platinum Pt 53, as shown in FIG. 7A, diffuses in the basic layer 53 in the form of nitrate ions $NO_3^-$ and becomes nitrates. That is, at this time, the $NO_x$ in the exhaust gas is absorbed in the form of nitrates inside of the basic layer 53.

Figure 7B:
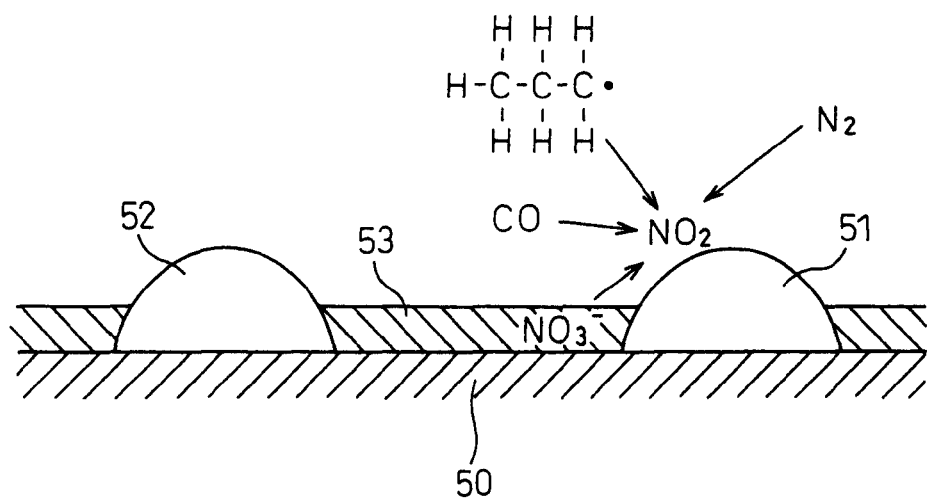

On the other hand, FIG. 7B shows the case where the air-fuel ratio of the exhaust gas which flows into the exhaust purification catalyst 13 is made the stoichiometric air-fuel ratio or rich when the $NO_x$ is absorbed in the form of nitrates inside of the basic layer 53. In this case, the oxygen concentration in the exhaust gas falls, so the reaction proceeds in the opposite direction ($NO_3^- \rightarrow NO_2$) and consequently the nitrates absorbed in the basic layer 53 become nitrate ions $NO_3^-$ one by one and, as shown in FIG. 7B, are released from the basic layer 53 in the form of $NO_2$. Next, the released $NO_2$ is reduced by the hydrocarbons HC and CO contained in the exhaust gas.

Figure 8:
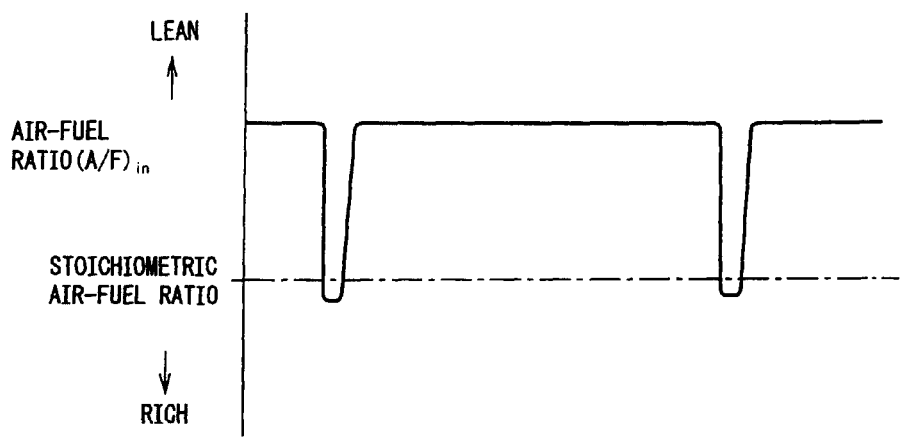
FIG. 8 is a view showing a change of an air-fuel ratio of exhaust gas flowing into an exhaust purification catalyst.

FIG. 8 shows the case of making the air-fuel ratio (A/F)in of the exhaust gas which flows into the exhaust purification catalyst 13 temporarily rich slightly before the $NO_x$ absorption ability of the basic layer 53 becomes saturated. Note that, in the example shown in FIG. 8, the time interval of this rich control is 1 minute or more. In this case, the $NO_x$ which was absorbed in the basic layer 53 when the air-fuel ratio (A/F)in of the exhaust gas was lean is released all at once from the basic layer 53 and reduced when the air-fuel ratio (A/F)in of the exhaust gas is made temporarily rich. Therefore, in this case, the basic layer 53 plays the role of an absorbent for temporarily absorbing $NO_x$.

Note that, at this time, sometimes the basic layer 53 temporarily adsorbs the $NO_x$ Therefore, if using term of storage as a term including both absorption and adsorption, at this time, the basic layer 53 performs the role of an $NO_x$ storage agent for temporarily storing the $NO_x$. That is, in this case, if the ratio of the air and fuel (hydrocarbons) which are fed into the engine intake passage, combustion chambers 2, and exhaust passage upstream of the exhaust purification catalyst 13 is called the air-fuel ratio of the exhaust gas, the exhaust purification catalyst 13 functions as an $NO_x$ storage catalyst which stores the $NO_x$ when the air-fuel ratio of the exhaust gas is lean and releases the stored $NO_x$ when the oxygen concentration in the exhaust gas falls.

Figure 9:
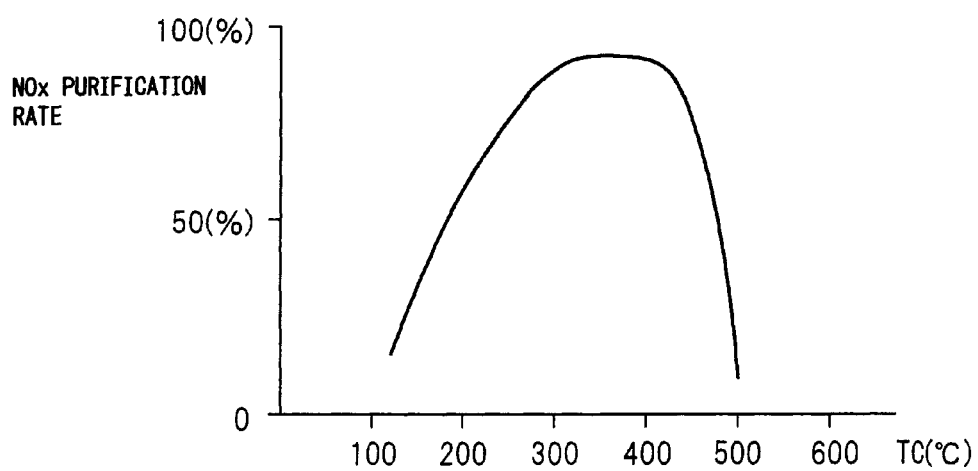
FIG. 9 is a view of an $NO_x$ purification rate.

FIG. 9 shows the $NO_x$ purification rate when making the exhaust purification catalyst 13 function as an $NO_x$ storage catalyst in this way. Note that, the abscissa of the FIG. 9 shows the catalyst temperature TC of the exhaust purification catalyst 13. When making the exhaust purification catalyst 13 function as an $NO_x$ storage catalyst, as shown in FIG. 9, when the catalyst temperature TC is 300° C. to 400° C., an extremely high $NO_x$ purification rate is obtained, but when the catalyst temperature TC becomes a 400° C. or higher high temperature, the $NO_x$ purification rate falls.

In this way, when the catalyst temperature TC becomes 400° C. or more, the $NO_x$ purification rate falls because if the catalyst temperature TC becomes 400° C. or more, the nitrates break down by heat and are released in the form of $NO_2$ from the exhaust purification catalyst 13. That is, so long as storing $NO_x$ in the form of nitrates, when the catalyst temperature TC is high, it is difficult to obtain a high $NO_x$ purification rate. However, in the new $NO_x$ purification method shown from FIG. 4 to FIGS. 6A and 6B, as will be understood from FIGS. 6A and 6B, nitrates are not formed or even if formed are extremely fine in amount, consequently, as shown in FIG. 5, even when the catalyst temperature TC is high, a high $NO_x$ purification rate is obtained.

Therefore, in the present invention, an exhaust purification catalyst 13 is arranged in the engine exhaust passage for making the $NO_x$ contained in the exhaust gas and the reformed hydrocarbon react. Precious metal catalysts 51 and 52 are carried on the exhaust gas flow surface of the exhaust purification catalyst 13. Around the precious metal catalysts 51 and 52, a basic exhaust gas flow surface part 54 is formed. The exhaust purification catalyst 13 has the property of reducing the $NO_x$ which is contained in the exhaust gas if making the concentration of hydrocarbons flowing into the exhaust purification catalyst 13 vibrate by within a predetermined range of amplitude and within a predetermined range of period and has the property of the storage amount of the $NO_x$ which is contained in the exhaust gas increasing if making the vibration period of the hydrocarbon concentration longer than this predetermined range. At the time of engine operation, the amplitude and the vibration period of the concentration of hydrocarbons flowing into the exhaust purification catalyst 13 are controlled so as to enable the production of a sufficient amount of reducing intermediate for reducing the $NO_x$. Due to this, the $NO_x$ which is contained in the exhaust gas is reduced in the exhaust purification catalyst 13.

That is, the $NO_x$ purification method which is shown from FIG. 4 to FIGS. 6A and 6B can be said to be a new $NO_x$ purification method designed to remove $NO_x$ without forming almost any nitrates in the case of using an exhaust purification catalyst which carries a precious metal catalyst and forms a basic layer which can absorb $NO_x$. In actuality, when using this new $NO_x$ purification method, the nitrates which are detected from the basic layer 53 become much smaller in amount compared with the case where making the exhaust purification catalyst 13 function as an $NO_x$ storage catalyst. Note that this new $NO_x$ purification method will be called the first $NO_x$ purification method below.

Next, referring to FIG. 10 to FIG. 15, the first $NO_x$ purification method will be explained in a bit more detail.

Figure 10:
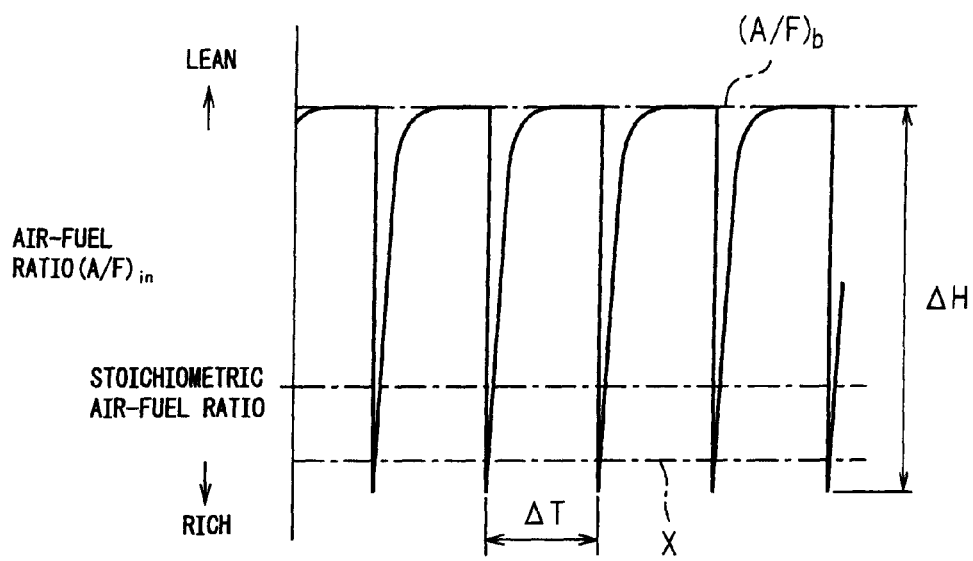
FIG. 10 is a time chart showing a change of an air-fuel ratio of exhaust gas flowing into an exhaust purification catalyst.

FIG. 10 shows enlarged the change in the air-fuel ratio (A/F)in shown in FIG. 4. Note that, as explained above, the change in the air-fuel ratio (A/F)in of the exhaust gas flowing into this exhaust purification catalyst 13 simultaneously shows the change in concentration of the hydrocarbons which flow into the exhaust purification catalyst 13. Note that, in FIG. 10, ΔH shows the amplitude of the change in concentration of hydrocarbons HC which flow into the exhaust purification catalyst 13, while ΔT shows the vibration period of the concentration of the hydrocarbons which flow into the exhaust purification catalyst 13.

Furthermore, in FIG. 10, (A/F)b shows the base air-fuel ratio which shows the air-fuel ratio of the combustion gas for generating the engine output. In other words, this base air-fuel ratio (A/F)b shows the air-fuel ratio of the exhaust gas which flows into the exhaust purification catalyst 13 when stopping the feed of hydrocarbons. On the other hand, in FIG. 10, X shows the upper limit of the air-fuel ratio (A/F)in which is used for producing the reducing intermediate without the produced active $NO_2$* being stored in the form of nitrates inside the basic layer 53. To make the active $NO_2$* and the reformed hydrocarbons react and produce the reducing intermediate, it is necessary to make the air-fuel ratio (A/F)in lower than the upper limit X of this air-fuel ratio.

In other words, in FIG. 10, X shows the lower limit of the concentration of hydrocarbons required for making the active $NO_x$* and reformed hydrocarbon react to produce a reducing intermediate. To produce the reducing intermediate, the concentration of hydrocarbons has to be made higher than this lower limit X. In this case, whether the reducing intermediate is produced is determined by the ratio of the oxygen concentration and hydrocarbon concentration around the active $NO_2$*, that is, the air-fuel ratio (A/F)in. The upper limit X of the air-fuel ratio required for producing the reducing intermediate will below be called the demanded minimum air-fuel ratio.

In the example shown in FIG. 10, the demanded minimum air-fuel ratio X becomes rich. Therefore, in this case, to produce the reducing intermediate, the air-fuel ratio (A/F)in is instantaneously made the demanded minimum air-fuel ratio X or less, that is, is made rich. As opposed to this, in the example shown in FIG. 11, the demanded minimum air-fuel ratio X becomes lean. In this case, the reducing intermediate is produced by maintaining the air-fuel ratio (A/F)in lean and periodically making the air-fuel ratio (A/F)in fall.

In this case, whether the demanded minimum air-fuel ratio X becomes rich or becomes lean depends on the oxidizing strength of the exhaust purification catalyst 13. In this case, the exhaust purification catalyst 13, for example, becomes stronger in oxidizing strength if increasing the carried amount of the precious metal 51 and becomes stronger in oxidizing strength if strengthening the acidity. Therefore, the oxidizing strength of the exhaust purification catalyst 13 changes due to the carried amount of the precious metal 51 or the strength of the acidity.

Figure 11:
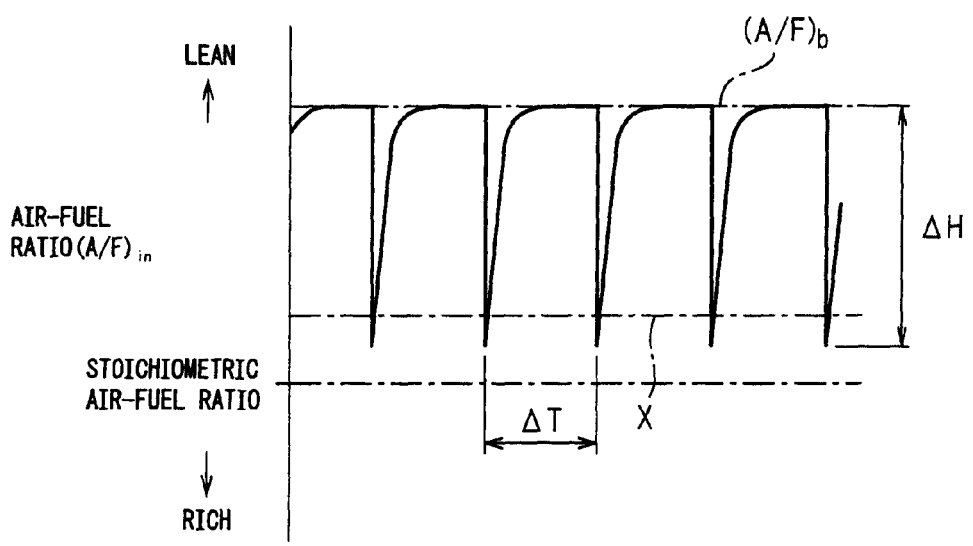
FIG. 11 is a time chart showing a change of an air-fuel ratio of exhaust gas flowing into an exhaust purification catalyst.

Now, if using an exhaust purification catalyst 13 with a strong oxidizing strength, as shown in FIG. 11, if maintaining the air-fuel ratio (A/F)in lean while periodically lowering the air-fuel ratio (A/F)in, the hydrocarbons end up becoming completely oxidized when the air-fuel ratio (A/F)in is reduced. As a result, the reducing intermediate can no longer be produced. As opposed to this, when using an exhaust purification catalyst 13 with a strong oxidizing strength, as shown in FIG. 10, if making the air-fuel ratio (A/F)in periodically rich, when the air-fuel ratio (A/F)in is made rich, the hydrocarbons will be partially oxidized, without being completely oxidized, that is, the hydrocarbons will be reformed, consequently the reducing intermediate will be produced. Therefore, when using an exhaust purification catalyst 13 with a strong oxidizing strength, the demanded minimum air-fuel ratio X has to be made rich.

On the other hand, when using an exhaust purification catalyst 13 with a weak oxidizing strength, as shown in FIG. 11, if maintaining the air-fuel ratio (A/F)in lean while periodically lowering the air-fuel ratio (A/F)in, the hydrocarbons will be partially oxidized without being completely oxidized, that is, the hydrocarbons will be reformed and consequently the reducing intermediate will be produced. As opposed to this, when using an exhaust purification catalyst 13 with a weak oxidizing strength, as shown in FIG. 10, if making the air-fuel ratio (A/F)in periodically rich, a large amount of hydrocarbons will be exhausted from the exhaust purification catalyst 13 without being oxidized and consequently the amount of hydrocarbons which is wastefully consumed will increase. Therefore, when using an exhaust purification catalyst 13 with a weak oxidizing strength, the demanded minimum air-fuel ratio X has to be made lean.

Figure 12:
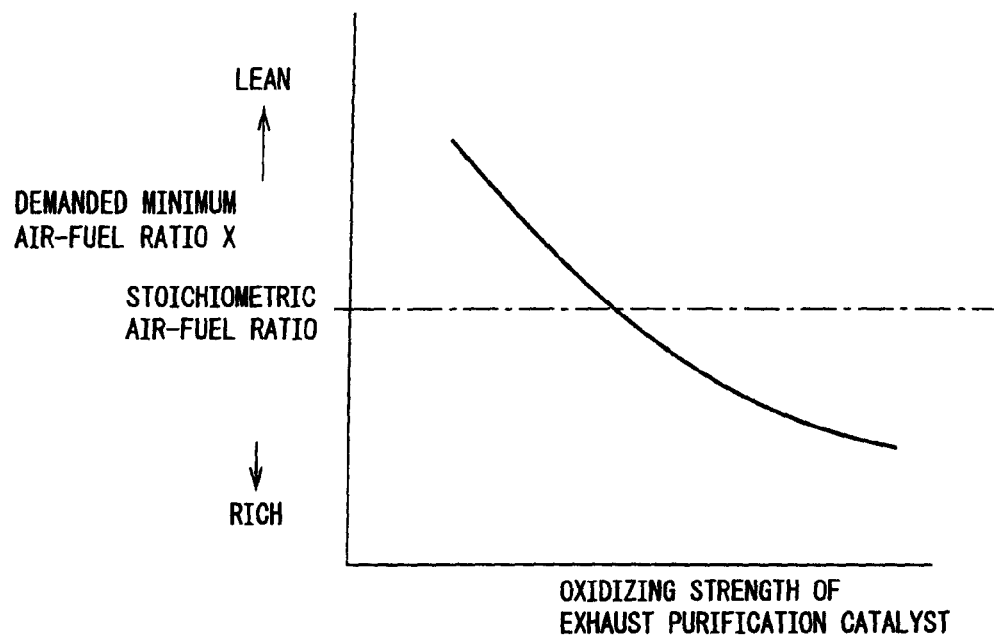
FIG. 12 is a view showing a relationship between an oxidizing strength of an exhaust purification catalyst and a demanded minimum air-fuel ratio X.

That is, it is learned that the demanded minimum air-fuel ratio X, as shown in FIG. 12, is reduced the stronger the oxidizing strength of the exhaust purification catalyst 13. In this way the demanded minimum air-fuel ratio X becomes lean or rich due to the oxidizing strength of the exhaust purification catalyst 13. Below, taking as example the case where the demanded minimum air-fuel ratio X is rich, the amplitude of the change in concentration of hydrocarbons flowing into the exhaust purification catalyst 13 and the vibration period of the concentration of hydrocarbons flowing into the exhaust purification catalyst 13 will be explained.

Now, if the base air-fuel ratio (A/F)b becomes larger, that is, if the oxygen concentration in the exhaust gas before the hydrocarbons are fed becomes higher, the feed amount of hydrocarbons required for making the air-fuel ratio (A/F)in the demanded minimum air-fuel ratio X or less increases and along with this the excess amount of hydrocarbons which did not contribute the production of the reducing intermediate also increases. In this case, to remove the $NO_x$ well, as explained above, it is necessary to make the excess hydrocarbons oxidize. Therefore, to remove the $NO_x$ well, the larger the amount of excess hydrocarbons, the larger the amount of oxygen which is required.

In this case, if raising the oxygen concentration in the exhaust gas, the amount of oxygen can be increased. Therefore, to remove the $NO_x$ well, when the oxygen concentration in the exhaust gas before the hydrocarbons are fed is high, it is necessary to raise the oxygen concentration in the exhaust gas after feeding the hydrocarbons. That is, the higher the oxygen concentration in the exhaust gas before the hydrocarbons are fed, the larger the amplitude of the hydrocarbon concentration has to be made.

Figure 13:
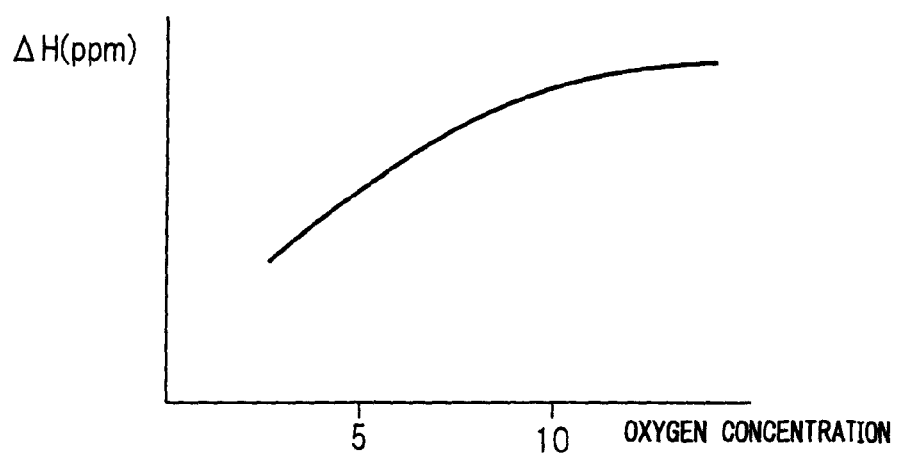
FIG. 13 is a view showing a relationship between an oxygen concentration in exhaust gas and an amplitude ΔH of a hydrocarbon concentration giving the same $NO_x$ purification rate.

FIG. 13 shows the relationship between the oxygen concentration in the exhaust gas before the hydrocarbons are fed and the amplitude $\Delta H$ of the hydrocarbon concentration when the same $NO_x$ purification rate is obtained. To obtain the same $NO_x$ purification rate, from FIG. 13, it is learned that the higher the oxygen concentration in the exhaust gas before the hydrocarbons are fed, the greater the amplitude $\Delta H$ of the hydrocarbon concentration has to be made. That is, to obtain the same $NO_x$ purification rate, the higher the base air-fuel ratio (A/F)b, the greater the amplitude $\Delta T$ of the hydrocarbon concentration has to be made. In other words, to remove the $NO_x$ well, the lower the base air-fuel ratio (A/F)b, the more the amplitude $\Delta T$ of the hydrocarbon concentration can be reduced.

Figure 14:
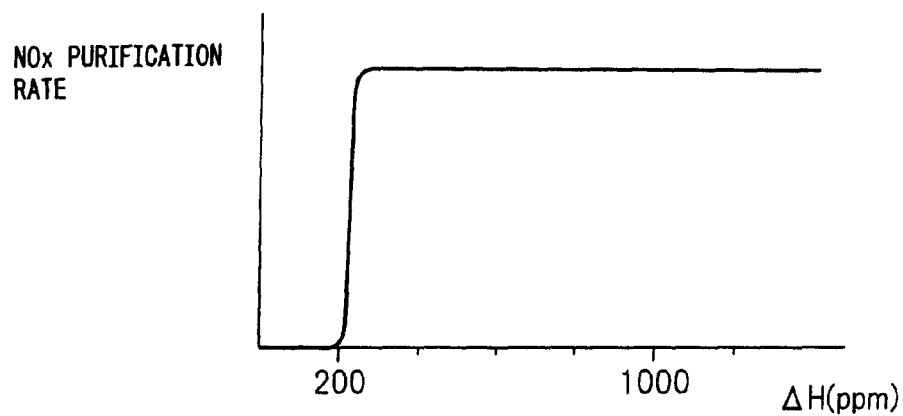
FIG. 14 is a view showing a relationship between an amplitude ΔH of a hydrocarbon concentration and an $NO_x$ purification rate.

In this regard, the base air-fuel ratio (A/F)b becomes the lowest at the time of an acceleration operation. At this time, if the amplitude $\Delta H$ of the hydrocarbon concentration is about 200 ppm, it is possible to remove the $NO_x$ well. The base air-fuel ratio (A/F)b is normally larger than the time of acceleration operation. Therefore, as shown in FIG. 14, if the amplitude $\Delta H$ of the hydrocarbon concentration is 200 ppm or more, an excellent $NO_x$ purification rate can be obtained.

On the other hand, it is learned that when the base air-fuel ratio (A/F)b is the highest, if making the amplitude $\Delta H$ of the hydrocarbon concentration 10000 ppm or so, an excellent $NO_x$ purification rate is obtained. Accordingly, in the present invention, the predetermined range of the amplitude of the hydrocarbon concentration is made 200 ppm to 10000 ppm.

Figure 15:
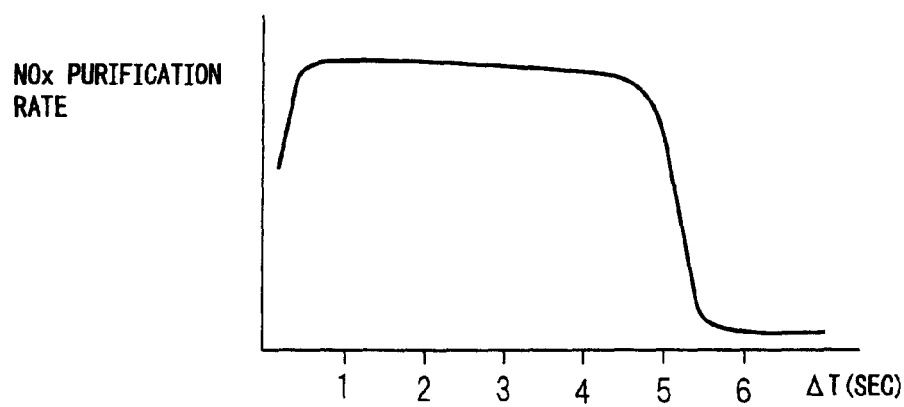
FIG. 15 is a view showing a relationship of a vibration period ΔT of a hydrocarbon concentration and an $NO_x$ purification rate.

Further, if the vibration period $\Delta T$ of the hydrocarbon concentration becomes longer, the oxygen concentration around the active $NO_2^*$ becomes higher in the time after the hydrocarbons are fed to when the hydrocarbons are next fed. In this case, if the vibration period $\Delta T$ of the hydrocarbon concentration becomes longer than about 5 seconds, the active $NO_2^*$ starts to be absorbed in the form of nitrates inside the basic layer 53. Therefore, as shown in FIG. 15, if the vibration period $\Delta T$ of the hydrocarbon concentration becomes longer than about 5 seconds, the $NO_x$ purification rate falls. Therefore, the vibration period $\Delta T$ of the hydrocarbon concentration has to be made 5 seconds or less.

On the other hand, if the vibration period $\Delta T$ of the hydrocarbon concentration becomes about 0.3 second or less, the fed hydrocarbons start to build up on the exhaust gas flow surface of the exhaust purification catalyst 13, therefore, as shown in FIG. 15, if the vibration period $\Delta T$ of the hydrocarbon concentration becomes about 0.3 second or less, the $NO_x$ purification rate falls. Therefore, in the present invention, the vibration period of the hydrocarbon concentration is made from 0.3 second to 5 seconds.

Next, the $NO_x$ purification method when making the exhaust purification catalyst 13 function as a $NO_x$ storage catalyst will be specifically explained while referring to FIG. 16 to FIG. 20. The $NO_x$ purification method when making the exhaust purification catalyst 13 function as an $NO_x$ storage catalyst in this way will be referred to below as the second $NO_x$ purification method.

Figure 16:
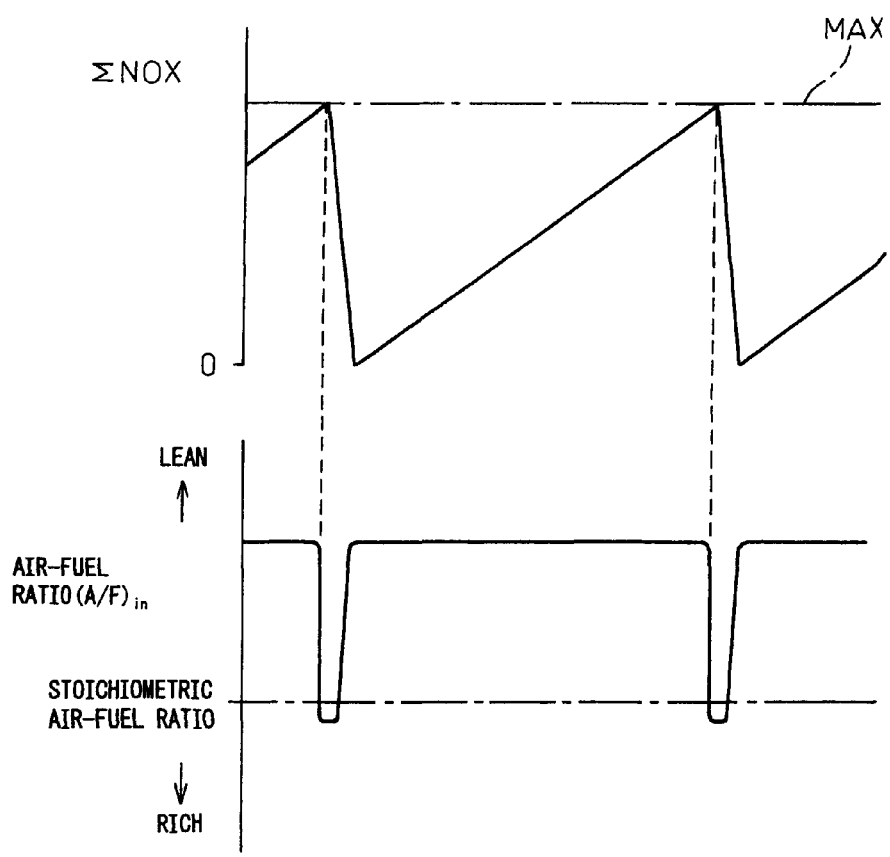
FIG. 16 is a time chart showing changes in an air-fuel ratio of exhaust gas flowing into an exhaust purification catalyst.

In this second $NO_x$ purification method, as shown in FIG. 16, when the stored $NO_x$ amount $\Sigma NOX$ which is stored in the basic layer 53 exceeds a predetermined allowable amount MAX, the air-fuel ratio (A/F)in of the exhaust gas flowing into the exhaust purification catalyst 13 is made temporarily rich. If the air-fuel ratio (A/F)in of the exhaust gas is made rich, the $NO_x$ which was stored in the basic layer 53 when the air-fuel ratio (A/F)in of the exhaust gas was lean is released all at once from the basic layer 53 and reduced. Due to this, the $NO_x$ is removed.

Figure 17:
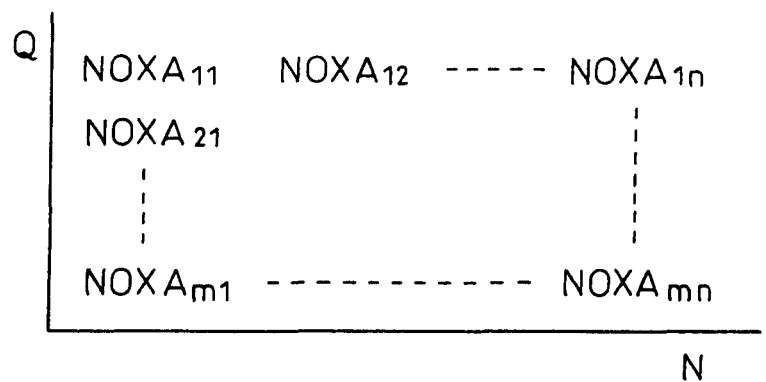
FIG. 17 is a view showing a map of a stored $NO_x$ amount NOXA.

The stored $NO_x$ amount $\Sigma NOX$ is, for example, calculated from the stored $NO_x$ amount of $NO_x$ which is exhausted from the engine and stored in the basic layer 53. In an embodiment of the present invention, the stored $NO_x$ amount NOXA of $NO_x$ which is exhausted from the engine per unit time and is stored in the basic layer 53 is stored as a function of the injection amount Q and engine speed N in the form of a map as shown in FIG. 17 in advance in the ROM 32. The stored $NO_x$ amount $\Sigma NOX$ is calculated from this stored $NO_x$ amount NOXA. In this case, as explained above, the period by which the air-fuel ratio (A/F)in of the exhaust gas is made rich is normally 1 minute or more.

Figure 18:
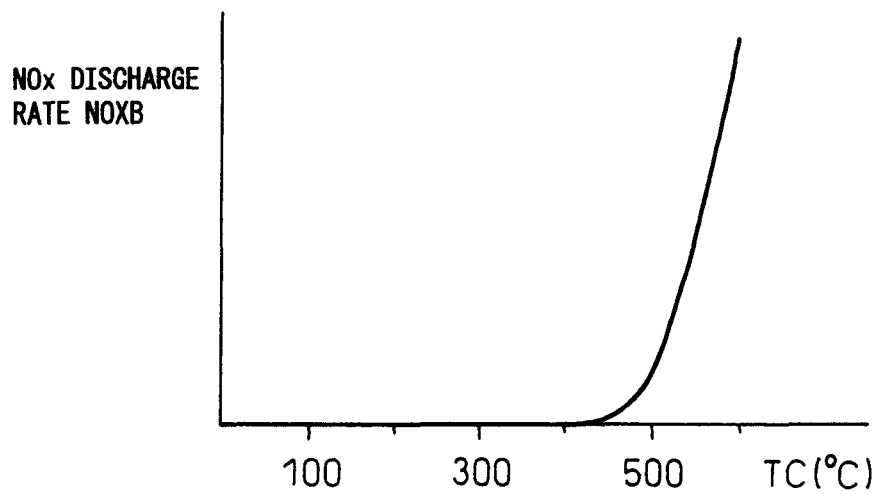
FIG. 18 is a view showing an $NO_x$ discharge rate NOXB.

FIG. 18 shows a discharge rate NOXD of the stored $NO_x$ which is discharged from the exhaust purification catalyst 13 when the air-fuel ratio (A/F)in of the exhaust gas is lean. As explained above, the $NO_x$ which is stored in the form of nitrates is broken down by heat and discharged if the temperature TC of the exhaust purification catalyst 13 rises. At this time, the $NO_x$ discharge rate NOXD, that is, the $NO_x$ amount NOXD which is discharged per unit time, rapidly rises if the temperature TC of the exhaust purification catalyst 13 exceeds the about 450° C. heat breakdown starting temperature.

Figure 19:
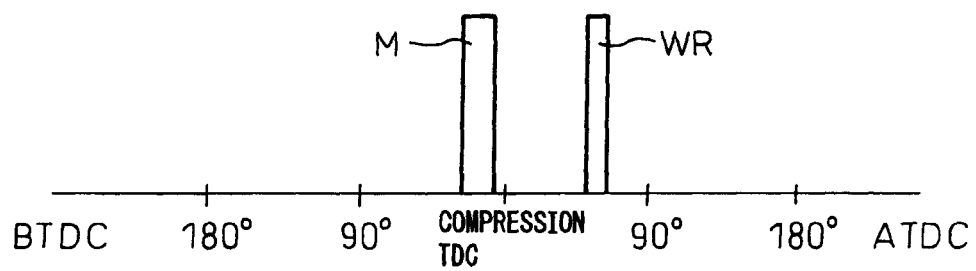
FIG. 19 is a view showing a fuel injection timing.
Figure 20:
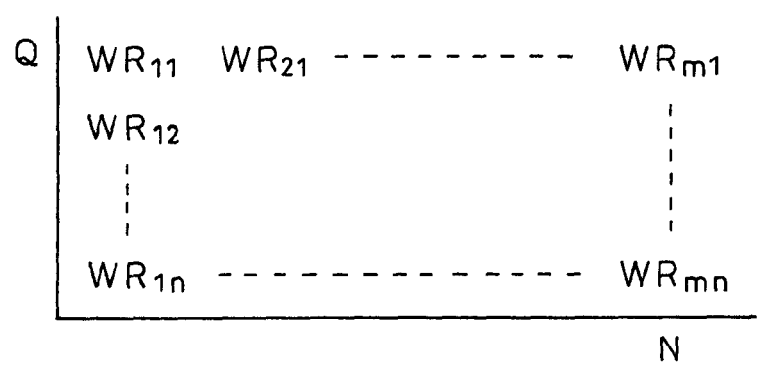
FIG. 20 is a view showing a map of additional fuel WR.

In this second $NO_x$ purification method, as shown in FIG. 19, by injecting additional fuel WR in addition to the combustion use fuel Q into the combustion chambers 2 from the fuel injectors 3, the air-fuel ratio (A/F)in of the exhaust gas flowing into the exhaust purification catalyst 13 is made rich. Note that, the abscissa of FIG. 19 shows the crank angle. This additional fuel WR is injected at a timing where it is burned, but does not appear as engine output, that is, slightly before ATDC90° after compression top dead center. This fuel amount WR is stored as a function of the injection amount Q and engine speed N in the form of a map as shown in FIG. 20 in advance in the ROM 32. Of course, in this case, it is also possible to make the feed amount of hydrocarbons from the hydrocarbon feed valve 15 increase so as to make the air-fuel ratio (A/F)in of the exhaust gas rich.

Now, in the present invention, normally, the first $NO_x$ purification method is used. At this time, by changing the hydrocarbon feed amount and injection timing from the hydrocarbon feed valve 15, the amplitude $\Delta H$ and vibration period $\Delta T$ of the hydrocarbon concentration are controlled so as to become optimal values in accordance with the operating state of the engine. In this case, as explained above, the reducing intermediate performs a central role for the purification of $NO_x$. Therefore, it is believed most suitable to focus on production of the reducing intermediate and control the amplitude $\Delta H$ and vibration period $\Delta T$ of the hydrocarbon concentration.

Therefore, in the present invention, as explained above, the amplitude $\Delta H$ and vibration period $\Delta T$ of the concentration of hydrocarbon flowing into the exhaust purification catalyst 13 is controlled so as to produce a sufficient amount of a reducing intermediate for reducing the $NO_x$. Explained in a bit more detail, in the present invention, at the time of engine operation, the demanded produced amount of the reducing intermediate required for reducing the $NO_x$ is calculated, and the amplitude $\Delta H$ and vibration period $\Delta T$ of the concentration of hydrocarbons flowing into the exhaust purification catalyst 13 is controlled so that the amount of production of the reducing intermediate becomes this demanded produced amount.

Therefore, first, the demanded produced amount of the reducing intermediate will be explained.

Now, the reducing intermediate R—NCD or R—NH$_2$ is produced from a single NO$_X$. Therefore, the demanded produced amount of the reducing intermediate (mol) required for reducing the NO$_X$ matches with the NO$_X$ amount (mol) to be reduced. In this case, the NO$_X$ amount to be reduced becomes the sum of the inflowing NO$_X$ amount which is exhausted from the engine and flows into the exhaust purification catalyst 13 and the released NO$_X$ amount which is stored in the exhaust purification catalyst 13 and is released from the exhaust purification catalyst 13. Therefore, the sum of these inflowing NO$_X$ amount and released NO$_X$ amount expresses the demanded produced amount of the reducing intermediate. If NO$_x$ is not stored in the exhaust purification catalyst 13, the released NO$_X$ amount becomes zero. Therefore, in this case, the inflowing NO$_X$ amount expresses the demanded produced amount of the reducing intermediate.

Note that, if able to maintain the amount of production of the reducing intermediate at the demanded produced amount, it is possible to remove all of the NO$_X$ to be reduced. Therefore, in the present invention, as explained above, the amplitude ΔH and vibration period ΔT of the concentration of hydrocarbon flowing into the exhaust purification catalyst 13 are controlled so that the amount of production of the reducing intermediate becomes the demanded produced amount.

Now, in an embodiment of the present invention, as the demanded produced amount of the reducing intermediate, the demanded produced amount per unit time, that is, the demanded production rate, is used. Similarly, as the inflowing NO$_X$ amount and released NO$_X$ amount, the inflowing NO$_X$ amount per unit time, that is, the NO$_X$ inflow rate, and the released NO$_X$ amount per unit time, that is, the NO$_X$ release rate, are used. In this case, the sum of the NO$_X$ inflow rate and the NO$_X$ release rate expresses the demanded production rate of the reducing intermediate.

Figure 21A:
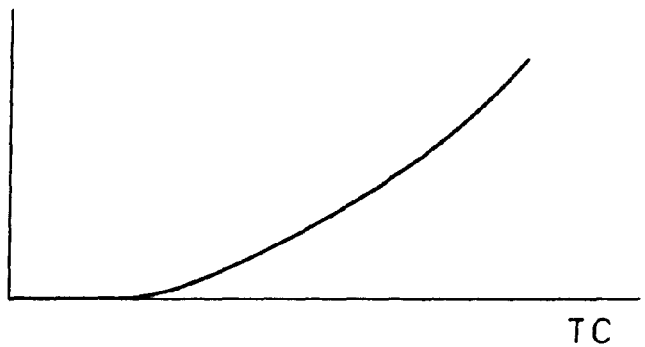
FIGS. 21A, 21B, and 21C are views showing an $NO_x$ release rate.
Figure 21B:
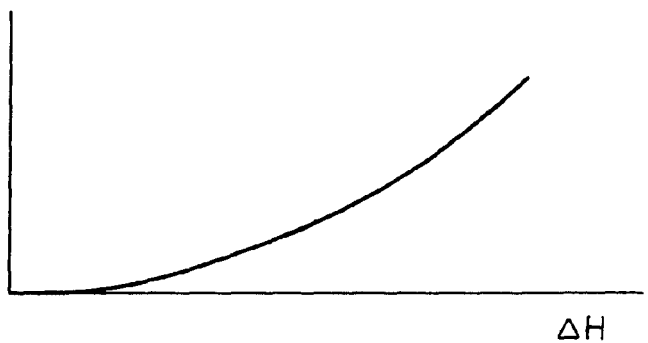

FIGS. 21A and 21B show the relationship between the NO$_X$ release rate of release from the exhaust purification catalyst 13 and the temperature TC of the exhaust purification catalyst 13 and the relationship between the NO$_X$ release rate and the amplitude ΔH of the hydrocarbon concentration when NO$_X$ purification processing is performed by the first NO purification method in the state where NO$_x$ is stored in the exhaust purification catalyst 13. As shown in FIG. 21A, if the temperature TC of the exhaust purification catalyst 13 becomes higher, the NO$_X$ release rate becomes higher.

Figure 21C:
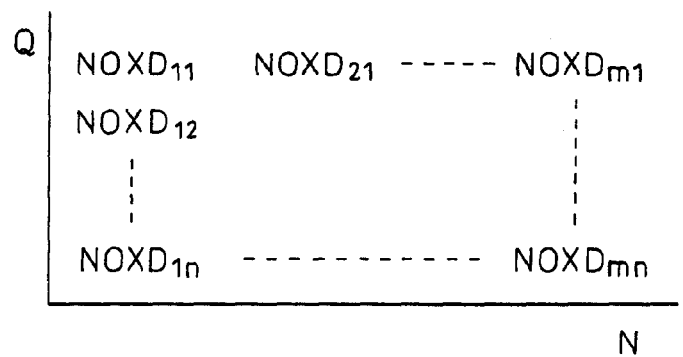

On the other hand, if the oxygen concentration in the exhaust gas flowing into the exhaust purification catalyst 13 falls, NO$_X$ is released from the exhaust purification catalyst 13. At this time, the larger the drop in the oxygen concentration, the greater the amount of release of NO$_X$. Therefore, as shown in FIG. 21B, if the amplitude ΔH of the hydrocarbon concentration becomes greater, the NO$_X$ release rate becomes higher. In this regard, if the operating state of the engine is determined, the temperature TC of the exhaust purification catalyst 13 and the amplitude ΔH of the hydrocarbon concentration are pretty much determined. Therefore, if the operating state of the engine is determined, the NO$_X$ release rate is determined. Therefore, in an embodiment of the present invention, the NO$_X$ release rate NOXD per unit time is stored as a function of the injection amount Q of fuel from the fuel injector 3 and engine speed N in the form of a map as shown in FIG. 21C in advance in the ROM 32.

In the present invention, the released NO$_X$ amount is calculated by multiplying the stored NO$_X$ amount which is stored in the exhaust purification catalyst 13 with the NO$_X$ release rate, that is, from the stored NO$_X$ amount and the NO$_X$ release rate. In this case, in an embodiment of the present invention, the stored NO$_X$ amount is constantly calculated as the ΣNOX shown in FIG. 16. This stored NO$_X$ amount ΣNOX is multiplied with the NO$_X$ release rate NOXD to calculate the NO$_X$ release rate (ΣNOX·NOXD). On the other hand, the NO$_X$ inflow rate is made the value NOXA of the map shown in FIG. 17. Therefore, the demanded production rate of the reducing intermediate is expressed by (ΣNOX·NOXD+ NOXA). Note that, in this case, it is possible to multiply (ΣNOX·NOXD+NOXA) with the purification rate demanded for the exhaust purification system according to the present invention so as to obtain the demanded production rate of the reducing intermediate.

Figure 22A:
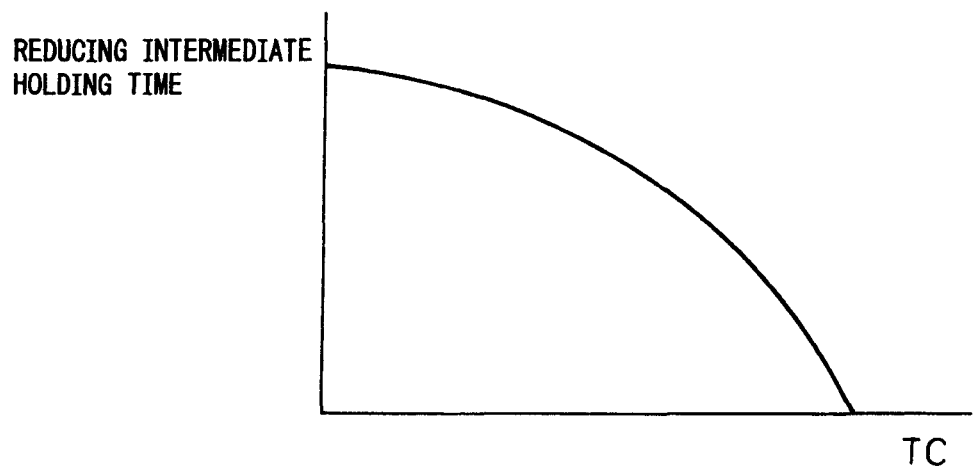
FIGS. 22A and 22B are views showing a reducing intermediate holding time etc.
Figure 22B:
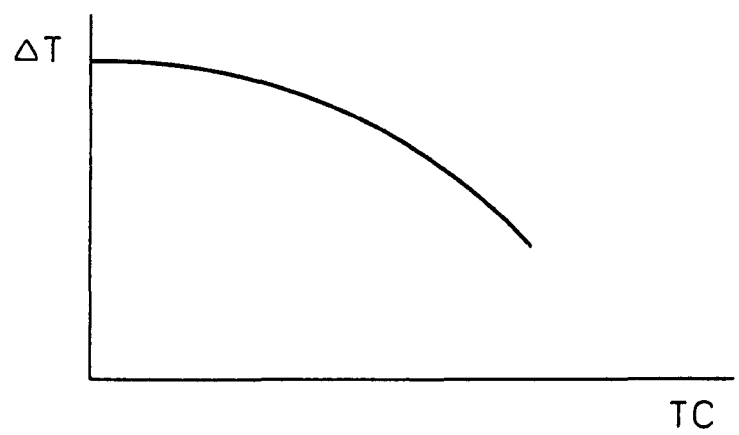

Next, referring to FIG. 22A and FIG. 22B, the reducing intermediate holding time able to hold the reducing intermediate produced on the basic layer 53 of the exhaust purification catalyst 13 will be explained. If the temperature TC of the exhaust purification catalyst 13 rises, the produced reducing intermediate easily separates from the basic layer 53. Therefore, as shown in FIG. 22A, as the temperature TC of the exhaust purification catalyst 13 becomes higher, the reducing intermediate holding time becomes shorter.

Now, if the vibration period ΔT of the hydrocarbon concentration becomes longer compared with the reducing intermediate holding time, a time period arises where there is no reducing intermediate and the NO$_X$ purification rate ends up falling. To prevent such a time period where there is no reducing intermediate from arising, the vibration period ΔT of the hydrocarbon concentration has to be made equal to the reducing intermediate holding time or has to be made shorter than the reducing intermediate holding time. Therefore, the vibration period ΔT of the hydrocarbons, as shown in FIG. 22B, is made shorter as the temperature TC of the exhaust purification catalyst 13 becomes higher. The relationship shown in FIG. 22A and FIG. 22B is stored in advance in the ROM 32.

Figure 23A:
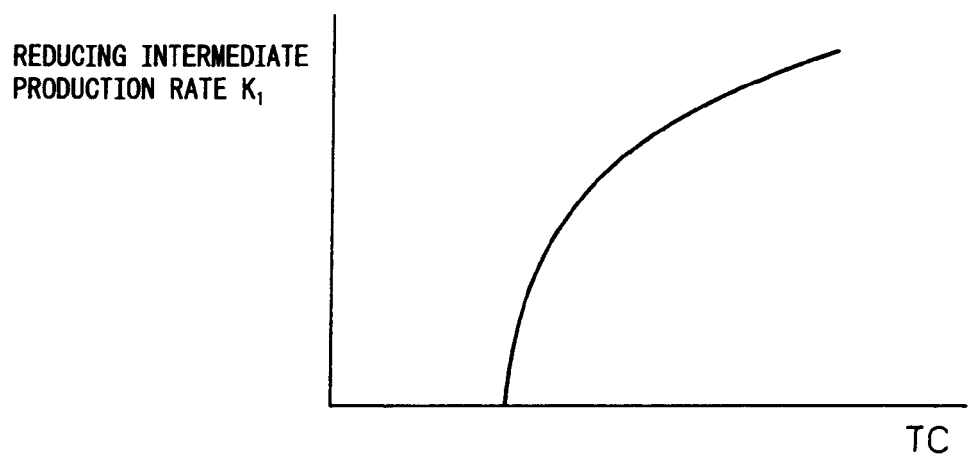
FIGS. 23A and 23B are views showing reducing intermediate production rates $K_1$ and $K_2$.
Figure 23B:
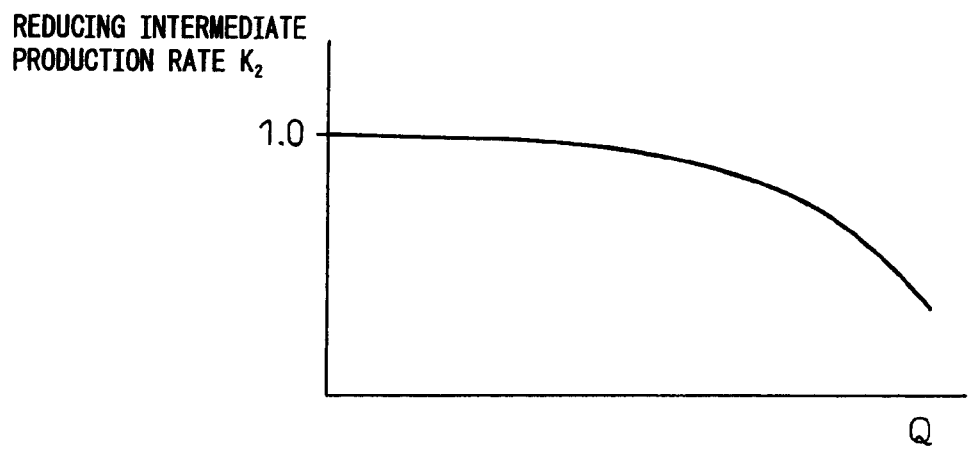

Next, referring to FIGS. 23A and 23B, the feed amount of hydrocarbons WF will be explained. FIG. 23A and FIG. 23B show the relationship between the reducing intermediate production rate $K_1$ of the time and the temperature TC of the exhaust purification catalyst 13 and the relationship between the reducing intermediate production rate $K_2$ and the injection amount Q from the fuel injector 3 when the reducing intermediate is produced by the fed hydrocarbons.

The reducing intermediate rapidly rises when the exhaust purification catalyst 13 is activated. Therefore, as shown in FIG. 23A, the reducing intermediate production rate $K_1$ rapidly rises when the temperature TC of the exhaust purification catalyst 13 becomes higher then gradually increases along with the rise of the temperature TC.

On the other hand, if the injection amount Q increases, that is, if the engine load becomes higher, the amount of NO$_x$ which is exhausted from the engine increases, therefore the demanded feed amount of the hydrocarbons also increases. However, if overly increasing the feed amount of hydrocarbons, the consumed amount of the hydrocarbons excessively increases. Therefore, to prevent the amount of consumption of hydrocarbons from excessively increasing in this way, if the injection amount Q increases, as shown in FIG. 23B, the reducing intermediate production rate $K_2$ is lowered. The relationship shown in FIG. 23A and FIG. 23B is stored in advance in the ROM 32.

If multiplying the feed amount of hydrocarbons WF with the two reducing intermediate production rates $K_1$, $K_2$, the produced reducing intermediate amount (WF·$K_1$·$K_2$) is obtained. In the present invention, this reducing intermediate amount (WF·$K_1$·$K_2$) is made the demanded produced amount of the reducing intermediate. Therefore, the feed amount of hydrocarbons WF becomes the demanded produced amount of the reducing intermediate divided by ($K_1$·$K_2$). The feed amount of hydrocarbons WF is calculated in this way. That is, the amplitude $\Delta H$ of the hydrocarbon concentration is determined.

That is, in the present invention, the holding time of the reducing intermediate which is held in the exhaust purification catalyst 13 and the reducing intermediate production rates $K_1$ and $K_2$ of the time when the reducing intermediate is produced from the fed hydrocarbons are stored in advance. The amplitude and vibration period of the concentration of hydrocarbons flowing to the exhaust purification catalyst 13 are calculated from the demanded produced amount of the reducing intermediate, the holding time of the reducing intermediate, and the reducing intermediate production rates $K_1$ and $K_2$.

Note that, in an embodiment of the present invention, as the reducing intermediate production rate $K_1$ shown in FIG. 23A, the reducing intermediate production rate per unit time is used. Therefore, in this embodiment, the amount of production of the reducing intermediate until hydrocarbons are next fed becomes the value of (WF·$F_1$·$F_2$) multiplied with the feed period $\Delta T$ of hydrocarbons. Therefore, in this case, the feed amount of hydrocarbons WF becomes the value of the demanded produced amount of the reducing intermediate divided by ($K_1$·$K_2$·$\Delta T$).

Next, a simple method for finding the feed amount of hydrocarbons WF will be explained with reference to FIGS. 24A to 25B.

Figure 24A:
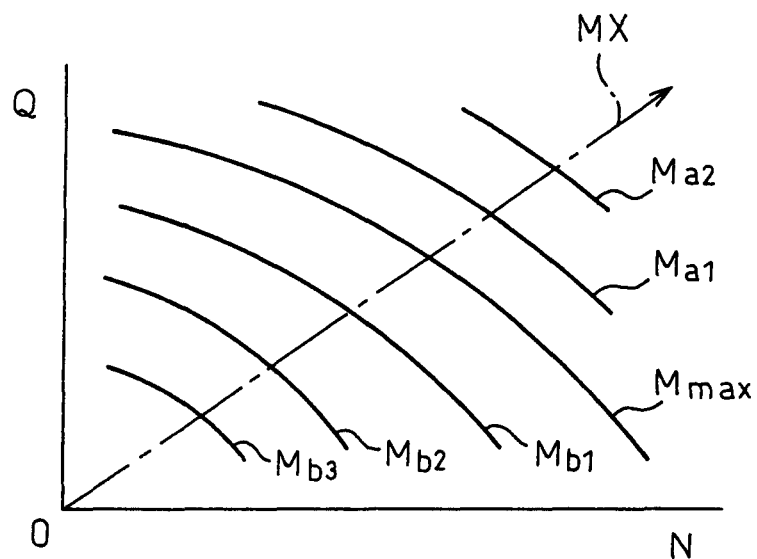
FIGS. 24A and 24B are views showing a maximum produced amount M of a reducing intermediate.
Figure 24B:
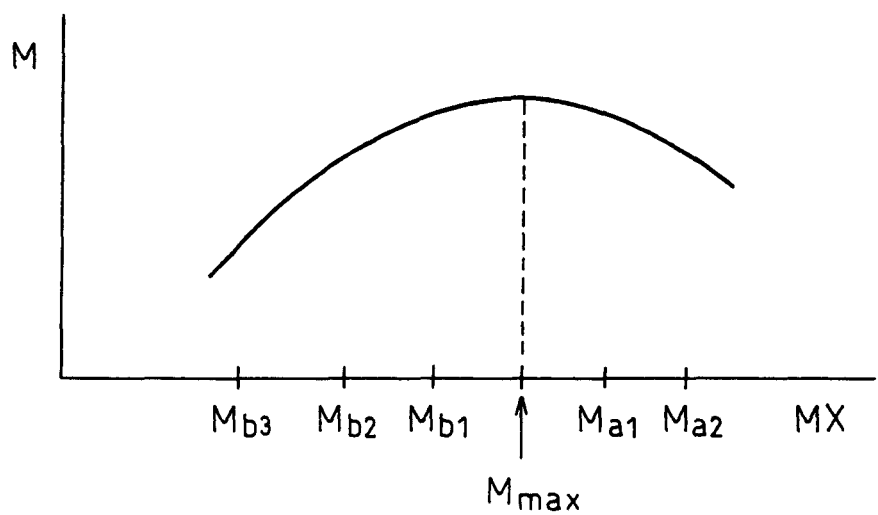

FIG. 24A shows the maximum produced amount M of the possible production of the reducing intermediate obtained using the reducing intermediate holding time or the reducing intermediate production rate or obtained by experiments. As will be understood from FIG. 24A, this maximum produced amount. M becomes the relationship of the injection amount Q and engine speed N from the fuel injector 3. On the other hand, FIG. 24B shows the change in the maximum produced amount M of the reducing intermediate on the line MX passing through the origin 0 of FIG. 24A. Note that, in FIG. 24A, $M_{a1}$, $M_{a2}$, $M_{max}$, $M_{b1}$, $M_{b2}$, and $M_{b3}$ show the equal maximum production lines, while $M_{max}$ shows the equivalent maximum production line giving the large maximum produced amount M.

Figure 25A:
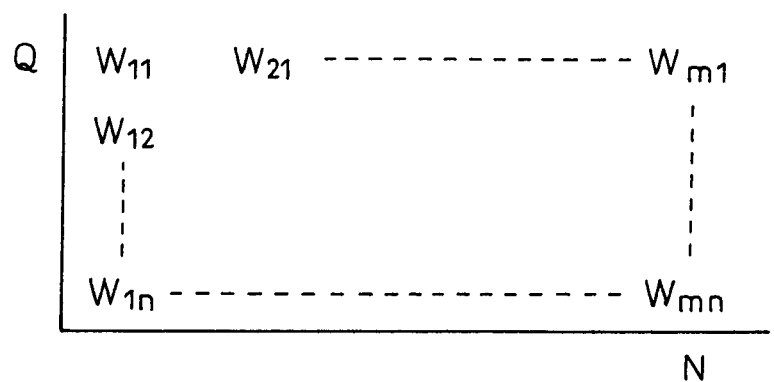
FIGS. 25A and 25B views showing a map of the fuel feed amount W etc.
Figure 25B:
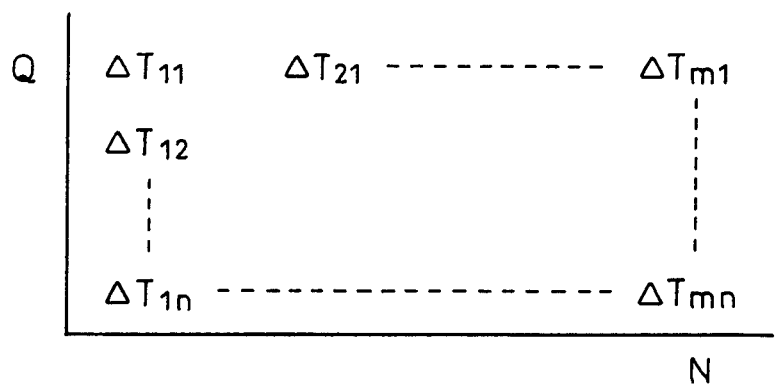

As will be understood from FIG. 24A and FIG. 25B, the lower the engine speed N and the smaller the injection amount Q, the smaller the maximum produced amount M, while the higher the engine speed N and the greater the injection amount Q, the smaller the maximum produced amount M.

Note that, in this embodiment, in actuality, M expresses the maximum produced amount per unit time, that is, the maximum production rate of possible production of the reducing intermediate. The feed amount of hydrocarbons W and the feed period $\Delta T$ of hydrocarbons of the time when this maximum production rate M is obtained are stored as function of the injection amount Q and engine speed N in the form of a map as shown in FIG. 25A and FIG. 25B in advance in the ROM 32.

Therefore, the feed amount of hydrocarbons W shown in FIG. 25A expresses the maximum feed amount in each operating state. Therefore, the feed amount of hydrocarbons is limited by the maximum feed amount W shown in FIG. 25A.

On the other hand, when the demanded produced amount of the reducing intermediate is smaller than the maximum produced amount M, if making the feed amount of hydrocarbons smaller than the maximum feed amount W shown in FIG. 25A, the amount of production of the reducing intermediate can be made the demanded produced amount.

At this time, in this embodiment, the feed amount of hydrocarbons is made the value obtained by multiplying the maximum feed amount W, which is determined in accordance with the operating state of the engine and shown in FIG. 25A, with the (demanded production rate of reducing intermediate/ maximum production rate M of reducing intermediate), while the feed period of the hydrocarbons is made the period $\Delta T$ in accordance with the operating state of the engine shown in FIG. 25B. In this way, in this embodiment, the maximum produced amount M of possible production of the reducing intermediate is stored in advance, and the amplitude $\Delta H$ and vibration period $\Delta T$ of the concentration of hydrocarbons flowing into the exhaust purification catalyst 13 are calculated from the maximum produced amount M and the demanded produced amount of the reducing intermediate.

Next, $NO_X$ release control according to the present invention will be explained.

Figure 26:
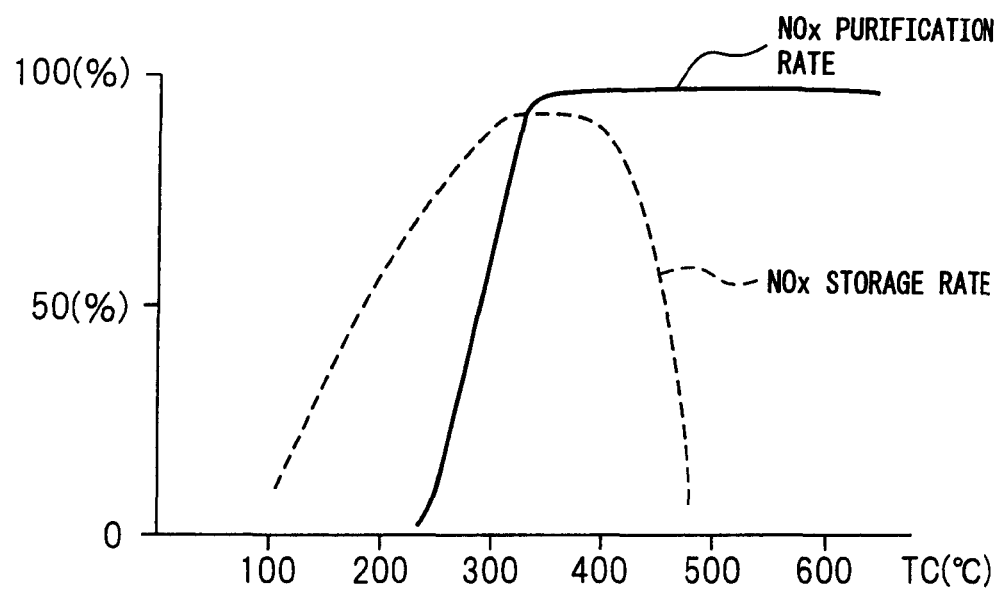
FIG. 26 is a view showing an $NO_x$ purification rate and an $NO_x$ storage rate.

FIG. 26 shows an $NO_X$ purification rate of the time when the first $NO_X$ purification method is used for $NO_X$ purification processing and the $NO_X$ storage rate to the exhaust purification catalyst 13 at the time when the second $NO_X$ purification method is used. In the present invention, when the $NO_X$ purification rate is higher than the $NO_X$ storage rate, that is, when the temperature TC of the exhaust purification catalyst 13 is relatively high, the first $NO_X$ purification method is used. When the $NO_X$ storage rate is higher than the $NO_X$ purification rate, that is, when the temperature TC of the exhaust purification catalyst 13 is low, the second $NO_X$ purification method is used. Therefore, at the time of engine startup, usually the second $NO_X$ purification method is used. When the temperature TC of the exhaust purification catalyst 13 becomes high, the second $NO_X$ purification method is switched to the first $NO_X$ purification method.

On the other hand, when the first $NO_X$ purification method is used to perform the $NO_X$ purification processing, if the $NO_X$ amount to be removed rapidly increases, sometimes the amount of reducing intermediate required for reducing the increased $NO_X$ can no longer be produced. In an embodiment of the present invention, the maximum produced amount M of possible production of the reducing intermediate shown in FIG. 24A is stored in the ROM 32 in advance. When the demanded produced amount of the reducing intermediate exceeds the maximum produced amount M, it is judged that the amount of reducing intermediate required for reducing the $NO_X$ can no longer be produced.

In this regard, if the amount of reducing intermediate required for reducing the $NO_X$ can no longer be produced in this way, that is, if the demanded produced amount of the reducing intermediate becomes larger than the maximum produced amount M shown in FIG. 24A, unless some sort of step is taken, a large amount of $NO_X$ will end up being exhausted from the exhaust purification catalyst 13. In the typical case where the demanded produced amount of the reducing intermediate becomes larger than the maximum produced amount M shown in FIG. 24A, the second $NO_X$ purification method is switched to the first purification method in the state where a large amount of $NO_X$ is stored in the exhaust purification catalyst 13.

Figure 27:
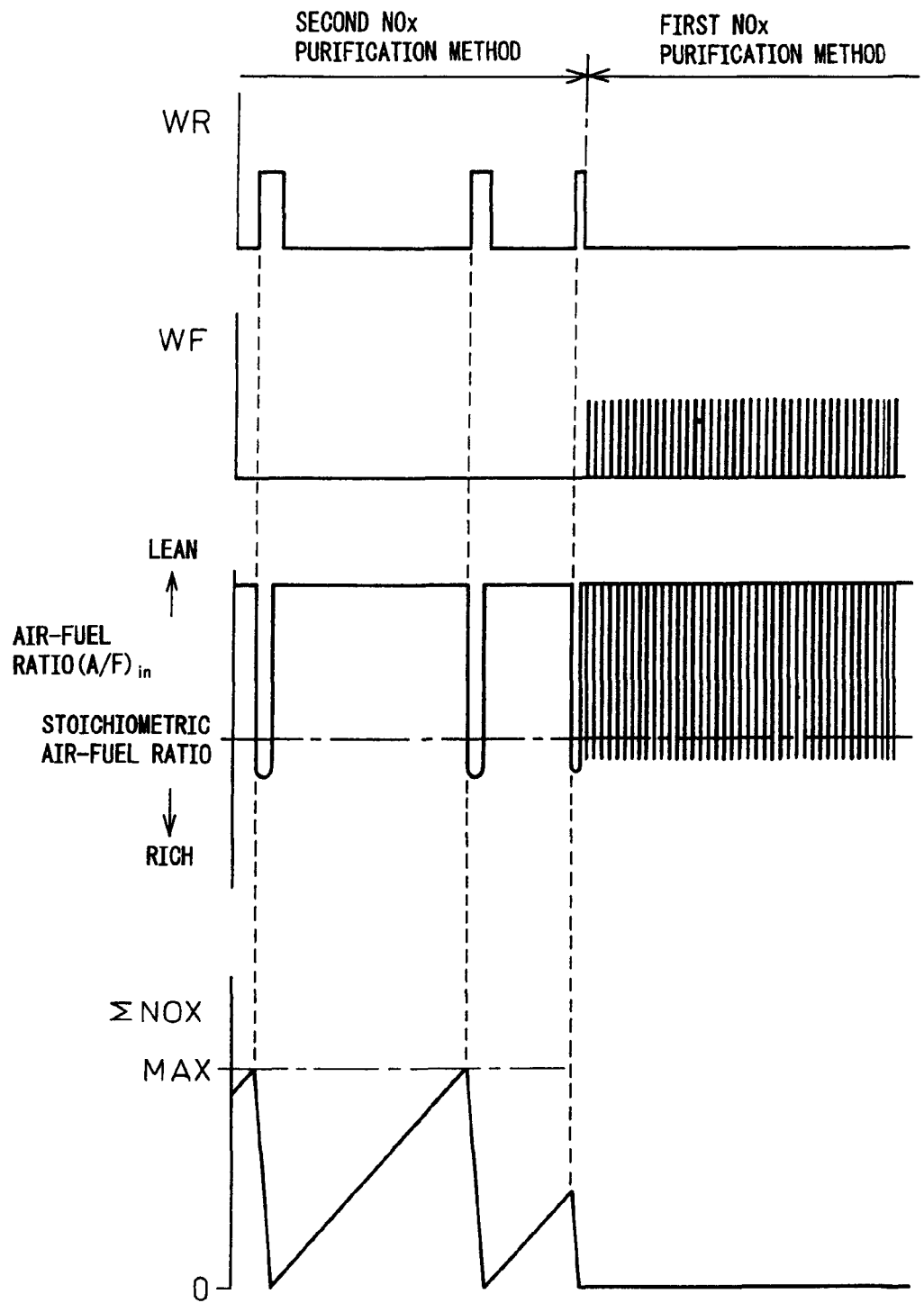
FIG. 27 is a time chart showing changes in the air-fuel ratio (A/F)in of the exhaust gas etc. at the time of switching from a second $NO_x$ purification method to a first $NO_x$ purification method.

At this time, the $NO_X$ which is stored in the exhaust purification catalyst 13 is rapidly released, so the demanded produced amount of the reducing intermediate becomes larger than the maximum produced amount M shown in FIG. 24A. At this time, in one embodiment according to the present invention, the feed amount of hydrocarbons is increased to increase the amount of hydrocarbons which is used for reduction of the $NO_X$, whereby the air-fuel ratio of the exhaust gas flowing into the exhaust purification catalyst 13 is temporarily made rich. FIG. 27 shows the time chart at this time, that is, at the time when the second $NO_X$ purification method is switched to the first $NO_X$ purification method.

Note that, FIG. 27 shows an injection timing of the additional fuel WR, a feed timing of hydrocarbons WR, a change of the air-fuel ratio (A/F)in of the exhaust gas flowing into the exhaust purification catalyst 13, and a change of the stored $NO_X$ amount ΣNOX stored in the exhaust purification catalyst 13. As shown in FIG. 27, when the second $NO_X$ purification method is switched to the first $NO_X$ purification method when the stored $NO_X$ amount ΣNOX is a positive value, $NO_x$ is released from the exhaust purification catalyst 13. To reduce the $NO_x$ which is released at this time, the additional fuel WR is fed and the inflowing air-fuel ratio (A/F)in is temporarily made rich. After that, the $NO_X$ purification processing by the first $NO_X$ purification method is started.

Figure 28:
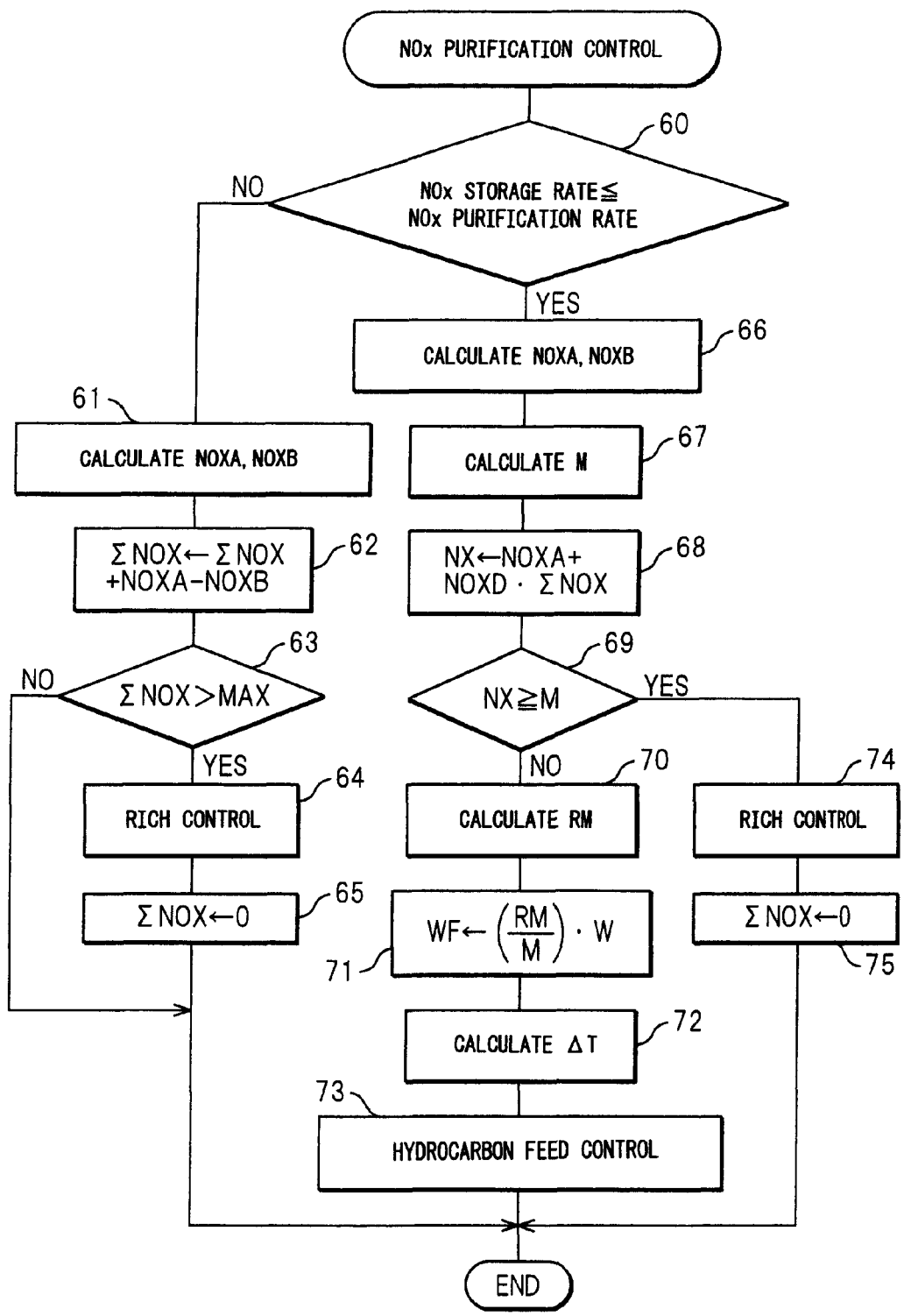
FIG. 28 is a flow chart for $NO_x$ purification control.

FIG. 28 shows a control routine for $NO_x$ purification for working this embodiment. This routine is executed by interruption every predetermined time interval.

Referring to FIG. 28, first, at step 60, it is judged if the $NO_x$ storage rate to the exhaust purification catalyst 13 where the second $NO_X$ purification method is used is lower than the $NO_x$ purification rate when using the first $NO_X$ purification method to perform the $NO_X$ purification processing. When the $NO_X$ storage rate is higher than the $NO_X$ purification rate, the routine proceeds to step 61 where the second $NO_X$ purification method is performed.

That is, at step 61, the stored $NO_X$ amount NOXA per unit time is calculated from the map shown in FIG. 17, while the $NO_X$ discharge rate NOXB is calculated from the relationship shown in FIG. 18. Next, at step 62, the following formula is used as the basis to calculate the $NO_X$ amount ΣNOX which is stored in the exhaust purification catalyst 14 during the $NO_X$ purification action by the first $NO_X$ purification method.

$$\Sigma NOX \leftarrow \Sigma NOX + NOXA - NOXD$$

Next, at step 63, it is judged if the stored $NO_X$ amount ΣNOX exceeds the allowable value MAX. If ΣNOX>MAX, the routine proceeds to step 64 where the additional fuel amount WR is calculated from the map shown in FIG. 20 and the injection action of additional fuel is performed. Next, at step 65, ΣNOX is cleared.

On the other hand, when it is judged at step 60 that the $NO_X$ storage rate is lower than the $NO_X$ purification rate, the routine proceeds to step 66 where the stored $NO_x$ amount per unit time, that is, the $NO_x$ inflow rate NOXA, is calculated from the map shown in FIG. 17 and the $NO_X$ release rate NOXD per unit time is calculated from the map shown in FIG. 21C. Next, at step 67, the maximum production rate M of the reducing intermediate is calculated from the relationship shown in FIG. 24A. Next at step 68, the sum NX of the $NO_X$ inflow rate NOXA and the $NO_X$ release rate (NOXD·ΣNOX) is calculated. Next, at step 69, it is judged if this sum NX is larger than the maximum production rate M of the reducing intermediate.

When the sum NX is smaller than the maximum production rate M, the routine proceeds to step 70 where the first $NO_X$ purification method is used to perform $NO_X$ purification processing. That is, at step 70, the demanded production rate of the reducing intermediate RM is calculated. In this embodiment, the sum NX is made the demanded production rate RM. In this case, this sum NX can be multiplied with the purification rate demanded for the exhaust purification system according to the present invention to obtain the demanded production rate RM. In this case, RM<NX.

Next, at step 71, the maximum feed amount W of hydrocarbons calculated from the map shown in FIG. 25A is multiplied with (demanded production rate RM/maximum production rate M) so as to calculate the feed amount of hydrocarbons WF (=(RM/M)·W). Next, at step 72, the feed period ΔT of hydrocarbons is calculated from the map shown in FIG. 25B. Next, at step 73, the calculated feed amount WF and feed period ΔT are used for feed control of the hydrocarbons.

On the other hand, when it is judged at step 69 that the sum NX of the $NO_X$ inflow rate and $NO_X$ release rate is larger than the maximum production rate M of the reducing intermediate, the routine proceeds to step 74 where the additional fuel amount required for reduction of the stored $NO_X$ is calculated and the injection action of additional fuel is performed. Next, at step 75, ΣNOX is cleared.

Figure 29A:
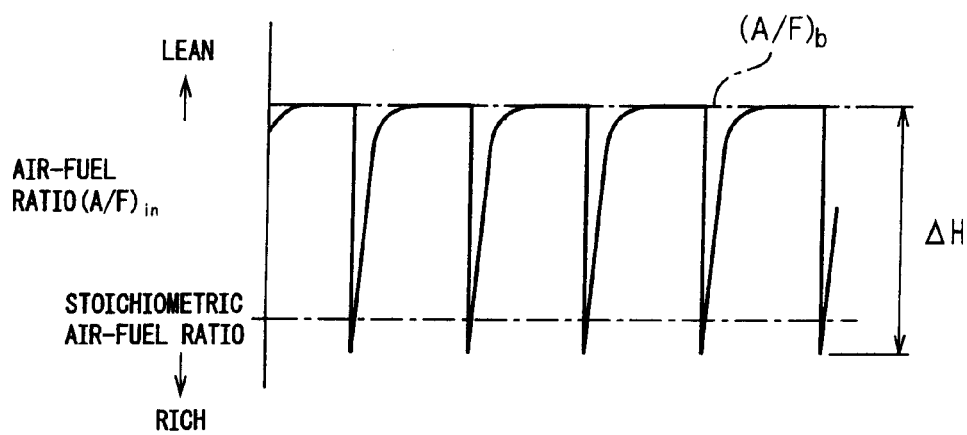
FIGS. 29A and 29B are views showing a change of the air-fuel ratio of the exhaust gas flowing into the exhaust purification catalyst.

FIG. 29A to FIG. 32 show another embodiment. In this embodiment, when the amount of reducing intermediate required for reducing the $NO_X$ cannot be produced, to increase the amount of hydrocarbons used for production of the reducing intermediate, the base air-fuel ratio (A/F)b is made smaller without changing the amplitude ΔH of the hydrocarbon concentration. That is, the state shown in FIG. 29A is made the state shown in FIG. 29B.

If the base air-fuel ratio (A/F)b is made smaller without changing the amplitude ΔH of the hydrocarbon concentration in this way, the minimum air-fuel ratio of the time when the hydrocarbons are fed becomes considerably small. As a result, the amount of hydrocarbons used for producing the reducing intermediate is increased. As a result, the amount of production of the reducing intermediate is increased and a large amount of $NO_X$ can be processed.

Figure 29B:
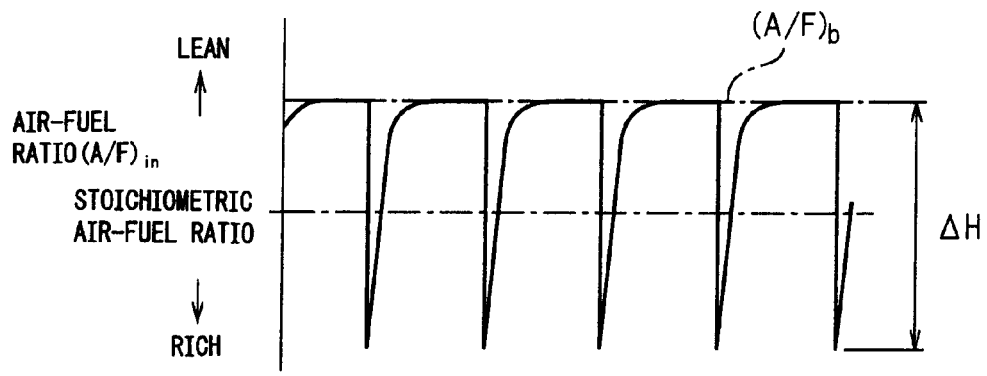
Figure 30:
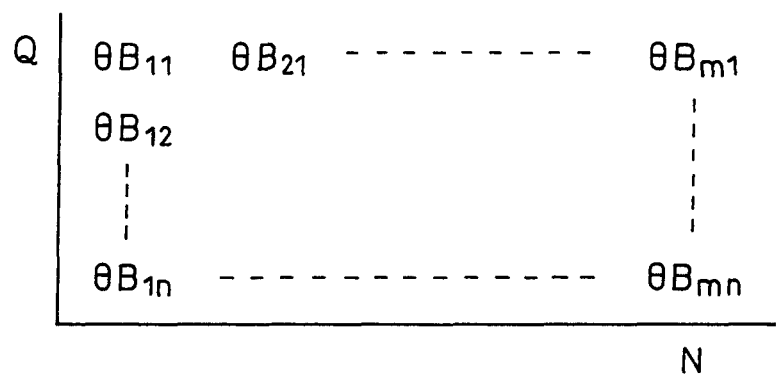
FIG. 30 is a view showing a map of the opening degree θB of the throttle valve.

In an embodiment of the present invention, the base air-fuel ratio (A/F)b is made smaller by making the opening degree of the throttle valve 10 smaller compared with the time of usual operation shown in FIG. 29A. In this embodiment, the opening degree θA of the throttle valve 10 at the time of normal operation shown in FIG. 29A and the opening degree θB of the throttle valve 10 at the time of when the base air-fuel ratio (A/F)b is made smaller as shown in FIG. 29B are found in advance. These opening degrees θA and θB are stored as a function of the injection amount Q and engine speed N in the form of a map in advance in the ROM 32. FIG. 30 shows a map of the opening degree θB stored in the ROM 32.

Figure 31:
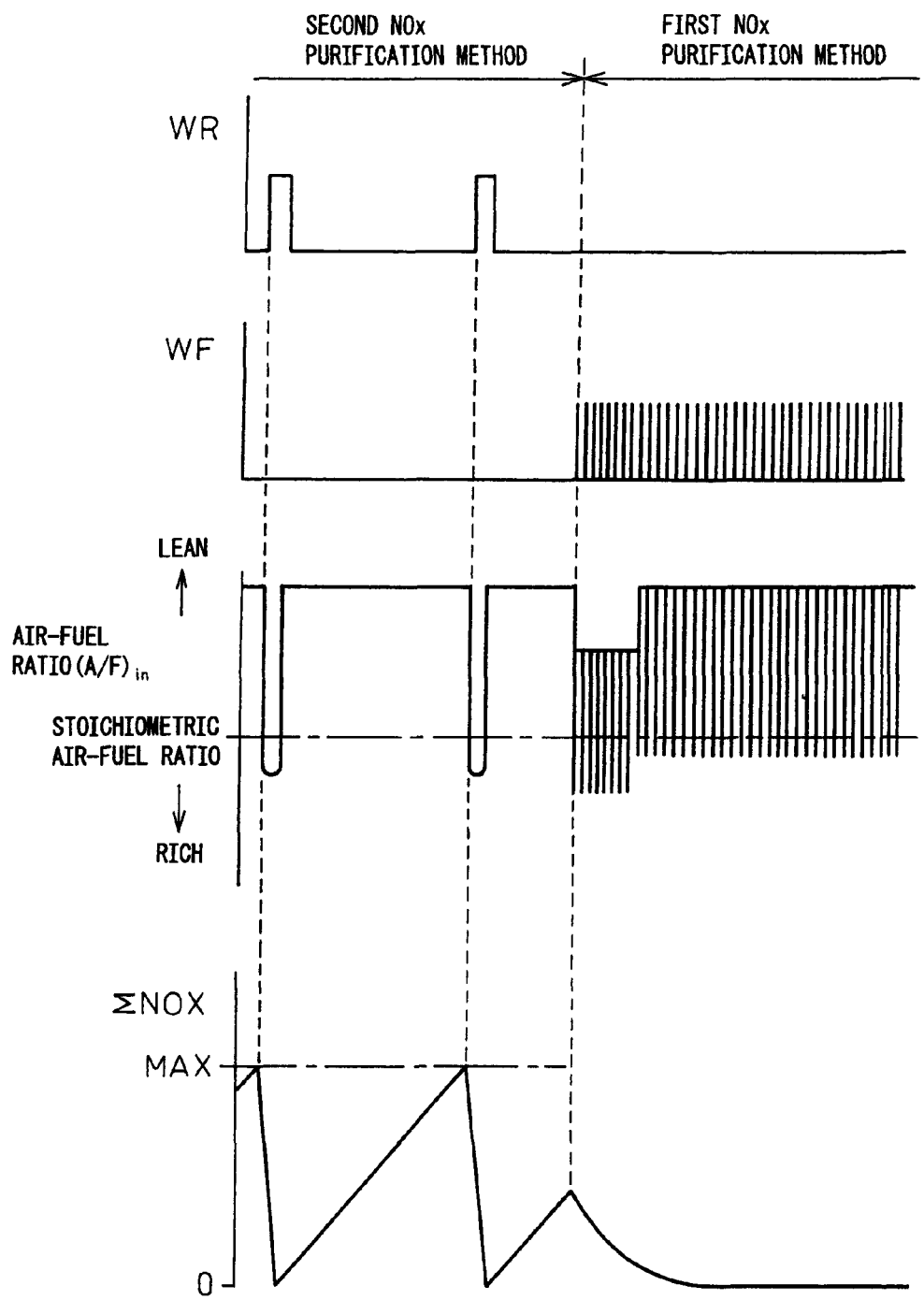
FIG. 31 is a time chart showing changes in the air-fuel ratio (A/F)in of the exhaust gas etc. at the time of switching from a second $NO_x$ purification method to a first $NO_x$ purification method.

In this embodiment, as shown in FIG. 31, when the second $NO_X$ purification method is switched to the first $NO_X$ purification method, right after switching, the base air-fuel ratio (A/F)b is temporarily made smaller.

Figure 32:
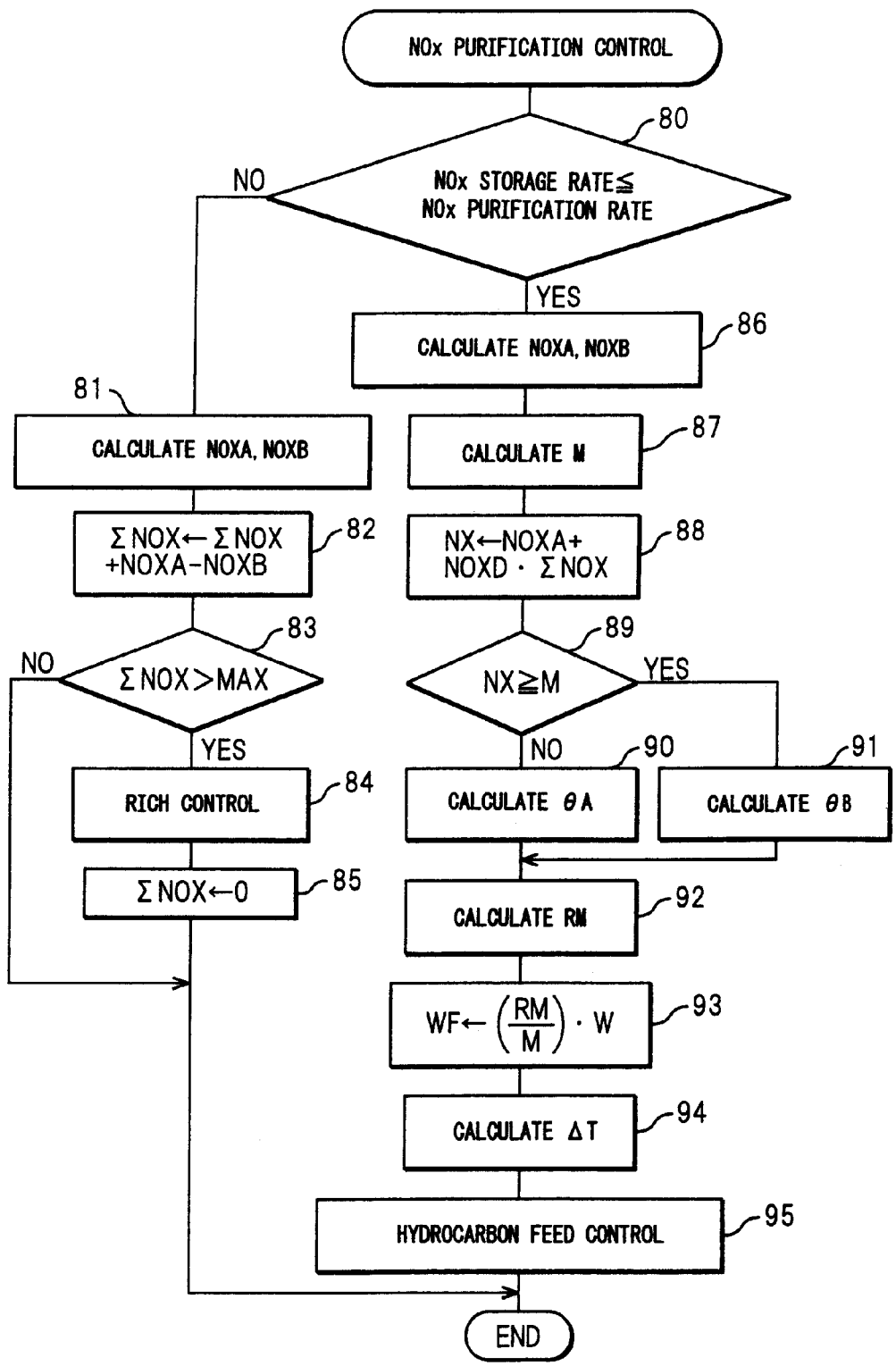
FIG. 32 is a flow chart for $NO_x$ purification control.

FIG. 32 shows the control routine for $NO_x$ purification for working this embodiment. This routine is also executed by interruption every predetermined time interval. Note that, steps 80 to 89 in this routine are the same as steps 60 to 69 of the routine shown in FIG. 28. Further, steps 92 to 95 of the routine shown in FIG. 32 are the same as steps 70 to 73 of the routine shown in FIG. 28.

That is, referring to FIG. 32, first, at step 80, it is judged if the $NO_x$ storage rate to the exhaust purification catalyst 13 at the time when the second $NO_x$ purification method is used is lower than the $NO_x$ purification rate at the time the first $NO_X$ purification method is used to perform the $NO_X$ purification processing. When the $NO_X$ storage rate is higher than the $NO_X$ purification rate, the routine proceeds to step 81 where the second $NO_X$ purification method is performed.

That is, at step 81, the stored NO$_X$ amount NOXA per unit time is calculated from the map shown in FIG. 17, while the NO$_X$ discharge rate NOXB is calculated from the relationship shown in FIG. 18. Next, at step 82, the following formula is used as the basis to calculate the NO$_X$ amount ΣNOX stored in the exhaust purification catalyst 14 during the NO$_x$ purification action by the first NO$_X$ purification method.

$$\Sigma NOX \leftarrow \Sigma NOX + NOXA - NOXD$$

Next, at step 83, it is judged if the stored NO$_X$ amount ΣNOX exceeds the allowable value MAX. When ΣNOX>MAX, the routine proceeds to step 84 where the additional fuel amount WR is calculated from the map shown in FIG. 20 and an injection action of additional fuel is performed. Next, at step 85, ΣNOX is cleared.

On the other hand, when it is judged at step 80 that the NO$_X$ storage rate is lower than the NO$_X$ purification rate, the routine proceeds to step 86 where the stored NO$_x$ amount per unit time, that is, the NO$_x$ inflow rate NOXA, is calculated from the map shown in FIG. 17, and the NO$_X$ release rate NOXD per unit time is calculated from the map shown in FIG. 21C. Next, at step 87, the maximum production rate M of the reducing intermediate is calculated from the relationship shown in FIG. 24A. Next, at step 88, the sum NX of the NO$_X$ inflow rate NOXA and the NO$_X$ release rate (NOXD·ΣNOX) is calculated. Next, at step 89, it is judged if this sum NX is larger than the maximum production rate M of the reducing intermediate.

When the sum NX is smaller than the maximum production rate M, the routine proceeds to step 90 where the usual NO$_X$ purification processing by the first NO$_X$ purification method is performed. That is, at step 90, the stored opening degree θA of the throttle valve 10 at the time of normal operation is calculated, then the opening degree of the throttle valve 10 is made the opening degree θA. Next, at step 90, the demanded production rate of the reducing intermediate RM is calculated. In this embodiment, the sum NX is made the demanded production rate RM. In this case, as explained above, this sum NX can be multiplied with the production rate found for the exhaust purification system according to the present invention to obtain the demanded production rate RM.

Next, at step 93, the maximum feed amount W of the hydrocarbons calculated from the map shown in FIG. 25A is multiplied with the (demanded production rate RM/maximum production rate M) to calculate the feed amount of hydrocarbons WF(=(RM/M)·W). Next, at step 94, the feed period ΔT of hydrocarbons is calculated from the map shown in FIG. 25B. Next, at step 95, the calculated feed amount WF and feed period ΔT are used for feed control of the hydrocarbons.

On the other hand, when it is judged at step 89 that the sum NX of the NO$_X$ inflow rate and the NO$_X$ release rate is larger than the maximum production rate M of the reducing intermediate, the routine proceeds to step 91 where the opening degree θB of the throttle valve 10 for making the base air-fuel ratio (A/F)b smaller is calculated from the map shown in the FIG. 30 and the opening degree of the throttle valve 10 is made this opening degree θB. Next, the routine proceeds to step 92.

In this way, in the embodiment shown in FIG. 27 to FIG. 31, when the amount of reducing intermediate required for reducing the NO$_X$ cannot be produced, the amount of hydrocarbons which is used for producing the reducing intermediate or reducing the NO$_X$ is temporarily increased.

Figure 33:
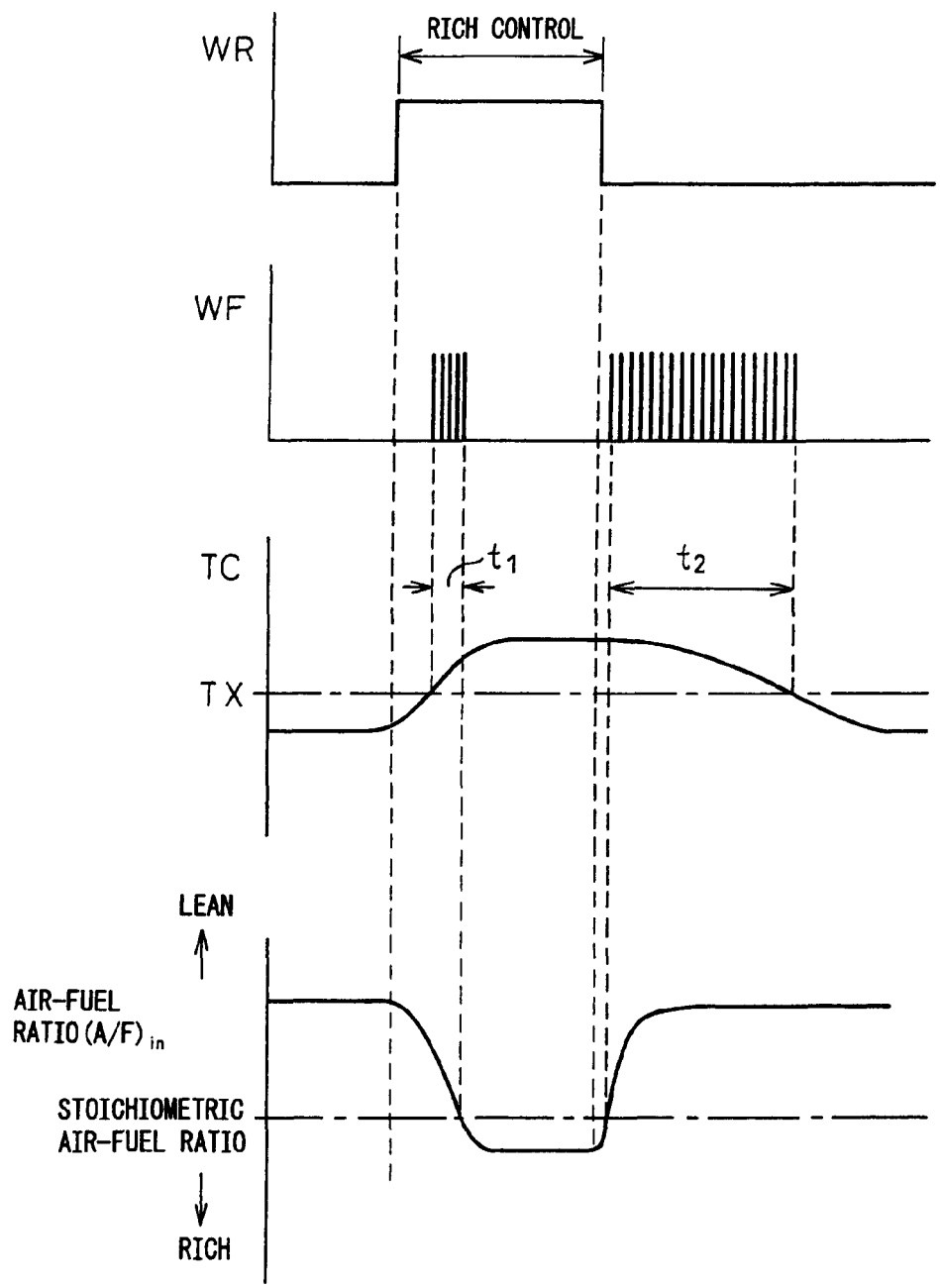
FIG. 33 is a view of a time chart at the time of rich control.

Next, referring to FIG. 33, still another embodiment will be explained. FIG. 33 shows the case where additional fuel WR is fed to the combustion chamber 2 so as to make the air-fuel ratio of the exhaust gas of the exhaust purification catalyst 13 temporarily rich to make the exhaust purification catalyst 13 release the stored NO$_X$ when the second NO$_X$ purification method is being used. Note that, in FIG. 33, TX shows the activation temperature of the exhaust purification catalyst 13. Therefore, FIG. 33 shows case when the temperature TC of the exhaust purification catalyst 13 is less than the activation temperature TX before the additional fuel WR is fed, that is, before rich control is performed for making the inflowing air-fuel ratio (A/F)in rich.

As shown in FIG. 33, if rich control is started, the heat of the oxidation reaction of the hydrocarbons which are exhausted from the combustion chamber 2 causes the temperature TC of the exhaust purification catalyst 13 to rapidly rise and exceed the activation temperature TX. On the other hand, even if rich control is started, the hydrocarbons which are exhausted from the combustion chambers 2 are used to consume the oxygen stored inside the exhaust purification catalyst 13. Therefore, even if rich control is started, the inflowing air-fuel ratio (A/F)b of the exhaust gas which flows into the exhaust purification catalyst 13 will not immediately become rich.

Now, if rich control is started and the inflowing air-fuel ratio (A/F)in becomes smaller, the NO$_x$ stored in the exhaust purification catalyst 13 is rapidly released. At this time, as shown in FIG. 33 at $t_1$, there is a time period where the temperature TC of the exhaust purification catalyst 13 becomes the activation temperature TX or more and the inflowing air-fuel ratio (A/F)in becomes lean. In this time period $t_1$, if the first NO$_X$ purification method is used for the NO$_X$ purification processing, the released NO$_X$ is used to produce the reducing intermediate and this reducing intermediate is used to reduce the released NO$_X$. Therefore, in this embodiment, in the time period $t_1$ of possible production of this reducing intermediate, the hydrocarbons WF are fed and the first NO$_x$ purification method is used for NO$_X$ purification processing.

On the other hand, even after completion of rich control, as shown in FIG. 33 at $t_2$, there is a time period where the temperature TC of the exhaust purification catalyst 13 becomes an activation temperature TX or more and the inflowing air-fuel ratio (A/F)in becomes lean. In this time period $t_2$ as well, if using the first NO$_X$ purification method to perform NO$_X$ purification processing, the released NO$_X$ is used to produce the reducing intermediate. In this case as well, this reducing intermediate is used to reduce the released NO$_X$. However, in this case, to build up the produced reducing intermediate, the hydrocarbons WF are fed by the time period $t_2$ of possible production of this reducing intermediate.

That is, in this embodiment, hydrocarbons WF are fed so as to be able to produce a reducing intermediate at the exhaust purification catalyst 13 at a possible reducing intermediate production period $t_1$ before the air-fuel ratio (A/F)in of the exhaust gas flowing to the exhaust purification catalyst 13 is switched from lean to rich after the additional fuel WR is fed and at the possible reducing intermediate production period $t_2$ after the air-fuel ratio (A/F)in of the exhaust gas flowing into the exhaust purification catalyst 13 is switched from rich to lean.

Figure 34A:
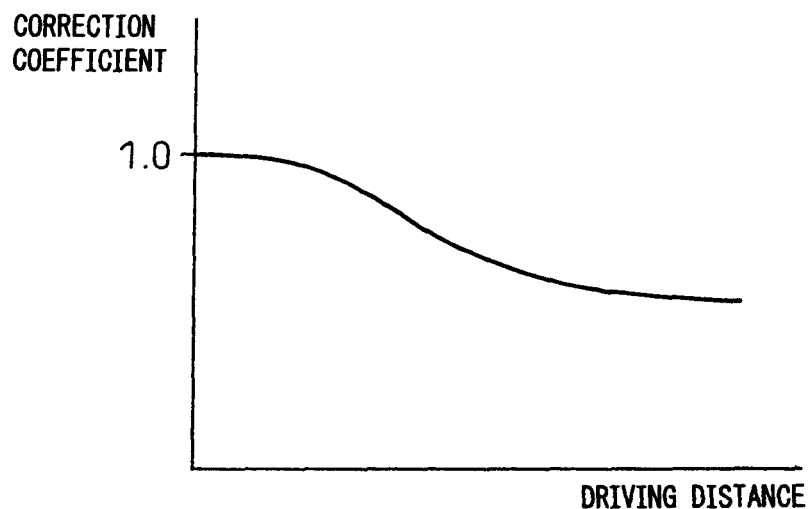
FIGS. 34A and 34B are views showing correction coefficients.
Figure 34B:
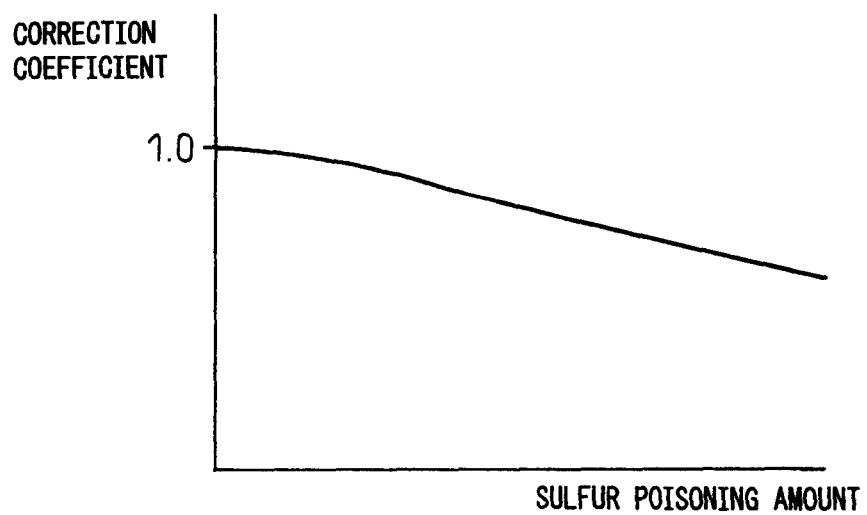

On the other hand, if the exhaust purification catalyst 13 deteriorates due to heat or is poisoned by sulfur, the NO$_X$ storage ability and the holding ability of the reducing intermediate fall. Therefore, in this case, the storable amount of NO$_x$ and the reducing intermediate holding time shown in FIG. 22A are preferably corrected in accordance with the heat deterioration or sulfur poisoning of the exhaust purification catalyst 13. FIG. 34A shows the correction coefficient for the storable amount of $NO_X$, while FIG. 34B shows the correction coefficient for the reducing intermediate holding time.

As shown in FIG. 34A, the correction coefficient for the storable amount of the $NO_X$ is made smaller the longer the driving distance of the vehicle, that is, the greater the heat deterioration of the exhaust purification catalyst 13 or sulfur poisoning amount. In this case, for example, if multiplying the allowable value MAX shown in FIG. 16 with this correction coefficient, the period of the rich control at the time when the second $NO_X$ purification method is used is made shorter the longer the driving distance of the vehicle. On the other hand, as shown in FIG. 34B, the correction coefficient for the reducing intermediate holding time is made smaller the greater the sulfur poisoning amount. In this case, for example, if multiplying the $\Delta T$ shown in FIG. 22B with this correction coefficient, the feed period $\Delta T$ of hydrocarbons is made shorter the greater the sulfur poisoning amount.

Note that, as another embodiment, it is also possible to arrange an oxidation catalyst for reforming the hydrocarbons in the engine exhaust passage upstream of the exhaust purification catalyst 13 and possible to arrange a catalyst for storing or holding the $NO_x$ in the engine exhaust passage upstream of the exhaust purification catalyst 13. When arranging a catalyst storing or holding the $NO_X$ in this range, $NO_x$ purification control is performed considering also the action of release of $NO_x$ from this catalyst.

REFERENCE SIGNS LIST

4 . . . intake manifold
5 . . . exhaust manifold
7 . . . exhaust turbocharger
12 . . . exhaust pipe
13 . . . exhaust purification catalyst
14 . . . particulate filter
15 . . . hydrocarbon feed valve

The invention claimed is:

1. A method for purifying exhaust gas of an internal combustion engine, the method comprising:
    flowing an exhaust gas containing $NO_x$ and a concentration of hydrocarbons in an exhaust gas passage that contains an exhaust purification catalyst,
    wherein the concentration of hydrocarbons is vibrated within a predetermined range of amplitude and within a predetermined range of period, and a least a portion of the hydrocarbons are reformed by the exhaust purification catalyst;
    reacting the $NO_x$ contained in the exhaust gas and the reformed hydrocarbons to produce a reducing intermediate containing nitrogen and hydrocarbons; and
    chemically reducing the $NO_x$ contained in the exhaust gas by a reducing action of the produced reducing intermediate,
    wherein at the time of engine operation, a demanded produced amount of the reducing intermediate required for chemically reducing the $NO_x$ is calculated, and the amplitude and vibration period of the concentration of hydrocarbons flowing into the exhaust purification catalyst are controlled so that an amount of the reducing intermediate produced becomes the demanded produced amount,
    wherein when an electronic control unit controls the vibration of the concentration of hydrocarbons flowing into the exhaust purification catalyst within the predetermined range of amplitude and within the predetermined range of period, the exhaust purification catalyst has a property of chemically reducing the $NO_x$ that is contained in the exhaust gas without storing, or with storing a fine amount of nitrates in a basic layer of the exhaust purification catalyst, and
    wherein the method further comprises a second method, wherein the second method comprises vibrating the concentration of hydrocarbons longer than the predetermined range, and when the concentration of hydrocarbons is vibrated longer than the predetermined range, the exhaust purification catalyst has a property of being increased in a storage amount of $NO_x$.

2. The method of claim 1, wherein the demanded produced amount of the reducing intermediate is expressed as a sum of an inflowing $NO_X$ amount that is exhausted from an engine and that flows into the exhaust purification catalyst, and a released amount of $NO_X$ that is stored in the exhaust purification catalyst and that is released from the exhaust purification catalyst.

3. The method of claim 2, wherein a $NO_x$ release rate of NO that is stored in the exhaust purification catalyst and that is released from the exhaust purification catalyst is stored in advance, and wherein the released $NO_X$ amount is calculated from a stored $NO_X$ amount that is stored in the exhaust purification catalyst and the $NO_X$ release rate.

4. The method of claim 1, wherein the method further comprises holding the reducing intermediate in the exhaust purification catalyst,
    a holding time of the reducing intermediate that is held in the exhaust purification catalyst and a reducing intermediate production rate at the time when the reducing intermediate is produced are stored in advance, and
    the amplitude and vibration period of the concentration of hydrocarbons flowing into the exhaust purification catalyst are calculated from the demanded production amount of the reducing intermediate, the holding time of the reducing intermediate, and the reducing intermediate production rate.

5. The method of claim 1, wherein a maximum produced amount of possible production of the reducing intermediate is stored in advance, and wherein the amplitude and vibration period of the concentration of hydrocarbons flowing into the exhaust purification catalyst are calculated from the maximum produced amount and the demanded produced amount of the reducing intermediate.

6. The method of claim 1, wherein the vibration period of the concentration of hydrocarbons is from 0.3 seconds to 5 seconds.

7. The method of claim 1, wherein when the amount of reducing intermediate required for chemically reducing the $NO_X$ cannot be produced, an amount of hydrocarbons used for producing the reducing intermediate or for chemically reducing the $NO_X$ is temporarily increased.

8. The method of claim 7, wherein a maximum produced amount of possible production of the reducing intermediate is stored in advance, and wherein when the demanded produced amount of the reducing intermediate exceeds the maximum produced amount, an electronic control unit determines that an amount of reducing intermediate required for chemically reducing the $NO_X$ cannot be produced.

9. The method of claim 7, wherein when the amount of reducing intermediate required for chemically reducing the $NO_X$ cannot be produced, a feed amount of hydrocarbons is increased to increase the amount of hydrocarbons used for reducing the $NO_X$ and an air-fuel ratio of an exhaust gas flowing into the exhaust purification catalyst is temporarily made rich.

10. The method of claim 7, wherein when the amount of reducing intermediate required for chemically reducing the $NO_x$ cannot be produced, a base air-fuel ratio is made smaller to increase an amount of hydrocarbons used for producing the reducing intermediate.

11. The method of claim 1, wherein the exhaust purification catalyst comprises a precious metal catalyst comprised of platinum (Pt) and at least one of rhodium (Rh) or palladium (Pd).

12. The method of claim 1, wherein the exhaust purification catalyst comprises a basic layer containing an alkali metal, an alkali earth metal, a rare earth, or a metal that can donate electrons to $NO_x$.

13. The method of claim 12, wherein the formed reducing intermediate is held on the basic layer.

14. The method of claim 1, wherein the method further comprises:
   feeding additional fuel to a combustion chamber so as to make an air-fuel ratio of an exhaust gas flowing into the exhaust purification catalyst temporarily rich to release a stored amount of $NO_x$, and
   when feeding the additional fuel to a combustion chamber so as to make an air-fuel ratio of an exhaust gas flowing into the exhaust purification catalyst temporarily, hydrocarbons are fed to enable production of the reducing intermediate at the exhaust purification catalyst at a reducing intermediate production period before the air-fuel ratio of the exhaust gas flowing to the exhaust purification catalyst is switched from lean to rich after the additional fuel is fed, and at a reducing intermediate production period after the air-fuel ratio of the exhaust gas flowing into the exhaust purification catalyst is switched from rich to lean.

15. A method for removing $NO_x$ contained in an exhaust gas of an internal combustion engine, the method comprising:
   flowing the exhaust gas containing $NO_x$ in an exhaust gas passage that comprises an exhaust purification catalyst,
      wherein the exhaust purification catalyst oxidizes at least a portion of the $NO_x$ in the exhaust gas thereby forming an active $NO_x$ compound;
   increasing a concentration of hydrocarbons in the exhaust gas,
      wherein at least a portion of the hydrocarbons are reformed in the exhaust gas catalyst;
   reacting the reformed hydrocarbons and at least a portion of the active $NO_x$ compound to produce a reducing intermediate containing nitrogen and hydrocarbons;
   lowering the concentration of hydrocarbons in the exhaust gas; and
   reacting the reducing intermediate and the active $NO_x$ compound, thereby chemically removing the $NO_x$ contained in an exhaust gas,
   wherein during the method, the $NO_x$ is chemically removed from the exhaust gas without storing, or with storing a fine amount of nitrates in the exhaust purification catalyst, and
   wherein the method further comprises a second method, wherein the second method comprises vibrating the concentration of hydrocarbons longer than the predetermined range, and when the concentration of hydrocarbons is vibrated longer than the predetermined range, the exhaust purification catalyst has a property of being increased in a storage amount of $NO_x$.

* * * * *